US008333016B1

(12) United States Patent
Keele

(10) Patent No.: US 8,333,016 B1
(45) Date of Patent: Dec. 18, 2012

(54) SUNDIAL FOR TELLING SOLAR TIME AND CLOCK TIME ACROSS A RANGE OF LATITUDES AND LONGITUDES

(76) Inventor: Richard Keele, San Diego, CA (US)

( * ) Notice: Subject to any disclaimer, the term of this patent is extended or adjusted under 35 U.S.C. 154(b) by 37 days.

(21) Appl. No.: 13/171,240

(22) Filed: Jun. 28, 2011

(51) Int. Cl.
*G01C 17/34* (2006.01)

(52) U.S. Cl. ........................................... 33/271; 33/270

(58) Field of Classification Search ............. 33/268–271
See application file for complete search history.

(56) References Cited

U.S. PATENT DOCUMENTS 89,585 A 5/1869 Johnson
303,118 A 8/1884 Christian
358,957 A 3/1887 Benson
740,978 A 10/1903 Hewitt
825,319 A 7/1906 Hewitt
849,683 A 4/1907 Hewitt
853,338 A 5/1907 Bissell
978,859 A 12/1910 Dick
1,270,505 A * 6/1918 Fields ............................ 33/268
1,289,837 A 12/1918 Love
1,651,621 A 12/1927 O'Sullivan
1,674,161 A 6/1928 De Bogory
1,875,756 A * 9/1932 O'Sullivan ...................... 33/270
2,033,604 A 3/1936 Arton
2,164,532 A 7/1939 Leinert
2,192,750 A 3/1940 Mead
2,463,781 A 3/1949 Lawrence
3,073,032 A * 1/1963 Fleming .......................... 33/269
3,110,108 A 11/1963 Sunblad
3,303,567 A 2/1967 Blanks
3,616,538 A 11/1971 Yabashi
4,050,161 A 9/1977 Yabashi
4,512,085 A * 4/1985 Liddell ........................... 33/269
4,520,572 A 6/1985 Spilhaus
4,890,269 A 12/1989 Buckner et al.
4,924,592 A 5/1990 Fuller
4,945,644 A 8/1990 Fuller
5,197,199 A * 3/1993 Shrader ........................... 33/270
5,253,225 A * 10/1993 Vaucher .......................... 368/20
5,459,931 A * 10/1995 Waltho ............................ 33/271
6,308,427 B1 10/2001 Kaufmann (Continued)

OTHER PUBLICATIONS

R. N. Mayall et al.; Sundials, Their Construction and Use (2000), cover, title page, biblio page, (pp. 156,157,189), Dover Publications, Inc., New York, US.

(Continued)

*Primary Examiner* — Yaritza Guadalupe-McCall
(74) *Attorney, Agent, or Firm* — The Maxham Firm

(57) ABSTRACT

A sundial for telling apparent solar time and clock time across a range of latitudes and longitudes. A solar dial is formed with an index point and a noon hour point. A plurality of concentric latitude indicia are centered at the index point and at least one map indicium is overlaid by the concentric latitude indicia where the map indicium has geographic latitudes corresponding with the concentric latitude indicia on the solar dial. The solar dial also includes a plurality of solar time indicia radiating generally outward from the index point drawn with respect to the noon hour point according to the hour line equation at each concentric latitude indicia intercept. An elongated gnomon projects from the index point, whereby the sun's shadow cast by the gnomon intersects the solar time indicia in relation to the concentric latitude indicia to provide a reading of apparent solar time for the user's location on the map indicium.

23 Claims, 11 Drawing Sheets

U.S. PATENT DOCUMENTS

| | | | | |
|---|---|---|---|---|
| 6,871,407 | B1 * | 3/2005 | Maegli | 33/270 |
| 7,114,262 | B2 | 10/2006 | Andrewes | |
| 7,516,557 | B2 * | 4/2009 | Courter | 33/270 |
| 7,555,840 | B2 * | 7/2009 | Chen | 33/269 |
| 8,091,245 | B2 * | 1/2012 | Popendorf | 33/270 |
| 2003/0029047 | A1 * | 2/2003 | Cheung | 33/270 |
| 2007/0214665 | A1 * | 9/2007 | Courter | 33/270 |
| 2009/0044417 | A1 * | 2/2009 | Chen | 33/269 |
| 2011/0225835 | A1 * | 9/2011 | Popendorf | 33/270 |

OTHER PUBLICATIONS

A. E. Waugh; Sundials, Their Theory and Construction (1973), cover page, title page, ISBN page, (pp. 160-162), Dover Publications, Inc., New York, US.

Wolfschmidt; The Uses of History in Science Education, A Historian Looks at Astronomy in the Classroom (Aug. 4, 2000), (25 pages), Munich, DE.

National Maritime Museum, Astronomical and Navigational Instruments (2008), (9 pages), from http://www.nmm.ac.uk.

* cited by examiner

SUNDIAL FOR TELLING SOLAR TIME AND CLOCK TIME ACROSS A RANGE OF LATITUDES AND LONGITUDES

FIELD OF THE INVENTION

This invention relates generally to planar sundials and specifically to an apparatus and a method by which a planar sundial can be constructed to tell time, both solar time and clock time, over a range of latitudes and longitudes by means of map indicia integrated with the sundial.

DISCUSSION OF PRIOR ART

Sundials can be classified into two broad categories, equiangular sundials and unequiangular sundials. Equiangular sundials are characterized by having their hour lines spaced at equal intervals on the dial, usually a spacing of fifteen degrees agreeing with the fifteen degree revolution of the earth in one hour's time. Sundials of this category are most often constructed using a surface of revolution, examples being a sphere, a cylinder, or a cone, on which surface the gnomon's shadow is cast. The gnomon is commonly fixed at the center of the surface of revolution. Unequiangular sundials are commonly implemented with a dial in the form of a planar surface, whether horizontal, vertical, or inclined. The hour lines are drawn to coincide with the shadow cast by the gnomon.

In general, planar sundials have a latitude term in the hour line equation, this latitude term being the latitude for which the sundial is designed and intended to be sited. For example, the hour lines for a horizontal sundial are drawn according to the hour line equation:

hour line angle from noon=arctan(sin(latitude)*tan (hours from noon*15)) EQ. 1

While the hour lines for a vertical sundial are drawn according to the hour line equation:

hour line angle from noon=arctan(cos(latitude)*tan (hours from noon*15)) EQ. 2

Those skilled in the art recognize that an unequiangular sundial not purpose-built for a specific installation site by latitude must include some compensation mechanism to account for the latitude at which it will be sited. Equiangular sundials do not in general require any correction for latitude since the hour line equation does not include a latitude term.

It is also recognized that all sundials require certain site preparation, including ensuring that the sundial is level to the horizon and oriented to the earth's North Pole. Corrections are required to account for the difference between apparent solar time and mean solar time caused by the seasonal variation of the positions of the earth and sun (the equation of time). Yet further corrections are required to convert mean solar time to standard time or daylight saving time in the time zone where the sundial is sited.

This well known series of corrections has been accomplished through a variety of prior art mechanisms. The prior art is organized below by topic.

The Use of Latitude Bands

The use of multiple bands of latitude to adapt a planar sundial to operate across a range of latitudes has been known for several centuries. For example, Gudrun Wolfschmidt writing on the University of Hamburg website in *The Uses of History in Science Education*, dated Jul. 30-Aug. 4, 2000, cites the earliest sundial to include a magnetic compass with declination indicated as a diptych by Georg Peurbach, circa 1451. The eight-band latitude scale includes hour lines drawn as continuous arcs.

In *Sundials: Their Construction and Use*, Dover Publications, Inc., 2000, Mayall provides an illustration of the Horizontal-Vertical Dial of Paulus Reinman. Mayall comments that this dial is representative of many diptych dials, constructed in the form of a multi-band horizontal dial, adding that such multi-band dials were commonly made for travelers to extend the use of the dial over a range of latitudes. A further observation is that such sundials often consisted of one to five bands laid out for intervals of three to four degrees of latitude and equipped with a gnomon adjustable to correspond to each latitude band.

The National Maritime Museum's collection of dials includes several noteworthy instruments of like construction including:

(AST0339) A diptych dial, circa 1600 of unknown maker, includes a magnetic compass, preset to an eight degree declination, and a five-band latitude scale ranging from 40 to 50 degrees north latitude. The hour lines through the latitude bands are continuous arcs. The string gnomon is mounted to a sliding mechanism which changes the gnomon angle. A table included on the lid provides offsets for regions in France.

(AST0438) A diptych dial, circa 1612, by Lesel, includes a magnetic compass having a ten degree west declination noted with a five-band latitude scale ranging from 42 to 54 degrees north. The hour lines through the latitude bands are marked in stair step fashion.

(AST0155) A diptych dial, circa 1629, by Karner, includes a magnetic compass preset to a four degree declination, with a four-band latitude scale ranging from 42 to 51 degrees north. The hour lines through the latitude bands are marked in stair step fashion. A string gnomon for use with this dial is attached between the inner surfaces of the two leaves and is adjustable for various latitudes.

And illustrating a true horizontal dial we find (AST0151), late $19^{th}$ century, made portable in a carrying box with the dial mounted atop the magnetic compass needle, a folding angularly adjustable triangular gnomon and four latitude bands ranging from 25 to 40 degrees north. The hour lines through the latitude bands are marked in discontinuous segments.

In *Sundials Their Theory and Construction*, Dover Publications, Inc., 1973, Waugh describes and illustrates the "sun watch" created by George Hollinwood of Ansonia Clock Co., circa 1922, which was promoted by the Boy Scouts of America. The sun watch is a horizontal sundial having three latitude bands; a circular band for latitude 45 degrees north, a central octagonal band for latitude 40 degrees north, and an outer rectangular band for latitude 35 degrees north. The three bands are individually marked in hash mark fashion. The sun watch includes a magnetic compass with declination scale. A table of latitudes and longitudes for numerous cities is included on the inside of the cover lid together with an equation of time correction table.

From the foregoing it is apparent that the use of some form of concentric latitude bands with hour lines drawn on each band as hash marks, in stair step fashion or as continuous arcs, can be readily found in the literature pre-dating any United States patents. It is further noted that making the required latitude adjustment is both a visual and a numerical process; the dial provides, through the multi-band structure, the apparent solar time at the latitude indicated by the band. Further visual interpretation yields a second estimate of the time, and a set of tabular data, usually included on the inner lid, provides specific numerical offsets for well known locations.

The Use of Techniques Other than Latitude Bands

There are solutions to the planar dial latitude problem utilizing techniques other than a multi-band dial. It should first be noted that many dials including, for example, equatorial dials, armillary dials, cylindrical dials, spherical dials, or most any dial using a surface of revolution as the dial with a central gnomon, have hour lines whose hour line equation is independent of the latitude term. Such dials need to be horizontal and aligned to true north and are typically equipped with tilting mechanisms, protractors, sliding devices and the like to accomplish such alignment. Such solutions are found in abundance, and are not cited here as they relate, as to latitude correction, only to non-planar type dials.

As to planar dials being adjusted for latitude, one structure of general interest discloses a vertical planar dial with an adjustable angle gnomon and an angularly adjustable mounting mechanism to adapt the dial to a range of latitudes. Another is a horizontal dial of fixed construction which is tilted on the horizontal by calibrated threaded supports to adapt the dial to a range of latitudes.

The tilting solution for either horizontal or vertical planar dials has been known since antiquity. It is well known that the horizontal dial need by nature be set horizontal. For fixed dials the pedestal is typically adjusted to accomplish this purpose or, conversely, the pedestal surface is intentionally shimmed out of level to adapt a dial to a different latitude. The focus of these structures is on the nature of the tilting mechanism made integral to the dial itself.

non-linear hour lines

It is interesting to note that there are a number of instances of sundials with non-linear hour lines in some form in dials of all types, be they planar or surfaces of revolution. Upon seeing such non-linear hour lines, one can readily distinguish the source and purpose for this non-linearity, which source is most commonly some incorporation of the equation of time into the drawing of the hour lines. However, these non-linear hour lines do not show, either in function or in use, curvilinear solar time indicia. To clarify this point, there has existed a dial in the form of a hollow globe where the hour lines are slightly curved to the right or left to correct the difference between the sun and the clock. Another early apparatus includes a dial in the form of a cylinder using curved hour lines to correct for the apparent slowness or fastness of the sun, the curves being in the form of a semi-analemma. Other known examples include: a "sun card" which is, in effect, a vertical planar dial, each card being designed for a specific vicinity, yet having non-linear hour lines which are computed taking into account the equation of time; a double hemispherical dial having curved lines to indicate mean solar time instead of sundial time, sundial time being apparent solar time, mean solar time being the time corrected for the equation of time; and a ring dial with interchangeable scales made for specific locations, the hour lines being slanted to account for the equation of time.

Conversion to Standard Time Including the Equation of Time Correction

Some known sundial structures focus on the translation from sundial time to clock time. This translation is, as stated previously, a multi-step one, first correcting apparent solar time to mean solar time (the equation of time correction), and second, correcting mean solar time to time zone time, whether standard time or daylight saving time. In relation to planar dials, an example shows on the disclosed time card the hour lines drawn to represent standard time. These cards are both location and date specific, and are cheap, being made of cardboard, paper, or the like and provide a straightforward solution.

Another example indicates that the vertical dial's mounting mechanism, allowing both tilting and rotation, can be used not only to correct for latitude but for any longitude, and to compare with the time used in any locality, or the various standard times.

Other prior art shows a vertical dial with dual offset gnomons or a horizontal dial with dual offset gnomons (both of which are made latitude specific, with hour lines equidistant on account of the gnomon offsets). Both can be tilted against either the vertical or horizontal to shift them to standard time (and then tilted again when shifting to daylight saving time). It is important to note that it is only on account of the fact that dual offset gnomons result in equiangular hour lines in the horizontal implementation that the horizontal dial can be rotated around its vertical axis to shift to daylight saving time. If one were to simply rotate an unequiangular horizontal dial to "spring ahead" one hour, setting it to read 1 p.m. at noon, the remainder of the hours would not read correctly.

In equiangular dials the translation from sundial time to standard time has been generally accomplished by either sliding the dial scale around the surface of revolution, or adding a second dial scale, or a vernier scale. These sliding type solutions can in one sweep correct for the equation of time and the conversion to clock time.

It appears that the majority of the prior art focused first on accuracy, the designers realizing that sundials based on a surface of revolution are much more amenable to accurate corrections for both the equation of time and longitude (that is, standard time) than their planar counterparts. Thus most patents relate to such dials using a surface of revolution. Since such dials are equiangular, and the face of a clock is likewise equiangular, no translation from an unequiangular solar dial face to an equiangular clock face is required.

Incorporation of Map Indicia

Some prior art sundials have incorporated map indicia in some manner. Examples include a map indicium of the northern hemisphere, viewed from the North Pole, which is depicted in the center of the dial. The map has centered upon it a magnetic compass needle bearing a ring type sundial. The user may read the ring dial, with no reference being made to the map indicium, then the time at any other place may be found by moving the magnetic compass needle to the latter place. Another employs a modified equatorial dial enclosed in a transparent world globe. The equatorial dial is of the focused lens type and operates as expected. Another map type sundial has a modified ring dial mounted adjacent to a world globe. After determining the mean solar time in the usual way the user can correct to local time by addition or subtraction of minutes based on longitude without reference to the included world globe. Also in this type of sundial prior art, a globe is included with an equatorial dial together with an artificial light so that the astronomic aspects of the sun to earth relationship can be taught. Another uses a hollow transparent world globe as the equatorial band of a reflected spot sundial. The reflected image of the sun appears on the inside of the globe, tracing a path through the course of the day. The globe does not carry any hour markings per se, it being left to the user to deduce the time by counting the number of meridians from the uppermost meridian, and perform the required addition or subtraction of one hour per meridian separation. A horizontal dial is provided with an intersecting grid of latitude and longitude lines over which a plumb bob is suspended from the tip of the gnomon in another example. The gnomon is fixed at a nominal latitude angle for North America. The dial is then tilted to correct it for actual latitude and rotated to correct for longitude by observing the plumb bob's position over the grid. In yet another attempt to incorporate a map, a horizontal sundial having a gnomic projection map indicium on the dial is employed, where the dial is made specific as to both latitude and longitude for the intended location.

Use of a Magnetic Compass

As noted in the section focusing on the use of latitude bands, a magnetic compass has been incorporated with sundials since antiquity. The requirement to orient a sundial to true north has been traditionally met by either a magnetic compass, a sighting tube for the polar star, or the combination of a second dial whose reading, when matched to that of a first dial, ensures correct orientation.

The present invention improves upon the prior art by combining the usual magnetic compass and declination marks with a map indicium having magnetic compass declination lines such that the user need only align the magnetic compass' south pole with his location on the map indicium to achieve the required declination setting.

SUMMARY OF EMBODIMENTS OF THE INVENTION

As will be clear from the detailed description herein, the embodiments of the present invention achieve several advantages and solve several shortcomings evidenced by known sundials. Among these are:

a) this apparatus allows the required latitude correction to be made by visual reference to latitude map indicia together with latitude dependent solar time indicia included on the sundial, eliminating a need for understanding lines of latitude, or knowing one's latitude, or of adjustments, tables of correction or mental calculations;
b) this sundial allows the required longitude corrections to be made by visual reference to a time zone map indicium included on the sundial; correcting for clock time, for time zone and for standard time or daylight saving time, eliminating the need for understanding lines of longitude or knowing one's longitude, or of adjustments, tables of correction, or mental calculations;
c) the sundial of an embodiment of the present invention, as described, allows the required gnomon angle adjustment to be made by visual reference to a gnomon support map indicium included on the gnomon support, eliminating a need for understanding the relationship between latitude and gnomon angle, or knowing one's latitude, or of protractors, tables of latitude or mental calculations;
d) this apparatus allows the required mean solar time correction to be made by visual reference to an equation of time graph indicium included on the sundial, eliminating the need for understanding apparent solar time versus mean solar time, or of the equation of time effect or for adjustments, tables of correction or mental calculations;
e) this sundial allows the required true north alignment to be made by visual reference to a magnetic declination map indicium included on the sundial together with a magnetic compass, eliminating any need for understanding magnetic versus true north, or knowing one's magnetic declination or for tables of correction, or mental calculations;
f) the sundial of embodiments of the present invention, as described, allows the required horizontal alignment to be made by visual reference to spirit levels included on the sundial, together with leveling means;
g) this apparatus is based on a planar form-factor and therefore achieves a compact and portable design, including the advantage of collapsibility, whereas sundials based on a surface of revolution are necessarily more bulky;
h) this sundial, being based on a planar form-factor, therefore achieves the purpose of showing time outside the general 6 a.m. to 6 p.m. time range whereas sundials based on a surface of revolution are often shadowed outside this range; and
i) the sundial of an embodiment of the present invention is completely self-contained, portable, and provides the user with a geographically based, visual, and non-technical method for set up and operation over a range of latitudes and longitudes.

The sundial of embodiments of the present invention incorporate many features known since antiquity, such as a multi-band dial and a magnetic compass but, in one aspect, uniquely augments each of these features with a number of map indicia, each map indicium being chosen and placed so as to allow the user to make the required adjustments and readings merely by visual reference to these geographic visual representations. This unique combination of the basic requirements of a planar sundial with geographic visual aids provides a self-contained sundial offering ease of use and practical portable application.

The present invention, as disclosed, relates to a planar sundial and how such a sundial can be constructed to function over a range of latitudes. One concept embodied in this apparatus is the use of a range of latitudes on the solar dial with curvilinear solar time indicia being drawn across this latitude range.

In contrast to some of the prior sundials mentioned above, the present sundial is intended to operate in a horizontal orientation and uses a continuous band of latitudes to form the dial. This band of latitudes is augmented with latitude map indicia permitting the user to make the adjustment in a geographical fashion. Most people, although familiar with the concept of latitude and longitude, could not give an accurate estimate of the latitude and longitude of their home, much less a location where they may have journeyed to visit, whereas travelers of old, those using the diptych dials cited above, were keenly aware of their latitude and longitude. For most people today the ability to view a map indicium and locate their position thereon is more comfortable and customary than referring to latitude and longitude position. In one aspect, the present invention provides a gnomon map indicium to support a geographical gnomon angle latitude adjustment.

The sundial of embodiments of the present invention incorporates multiple map indicia on the dial and on the gnomon support. These map indicia are not merely decorative, but function to allow the user to: 1) read the hour lines by geographical reference; 2) set the gnomon angle by geographical reference; and 3) set the north-pointing by geographical reference. This eliminates the need to know the numeric latitude or longitude, and to eliminate completely any numerical correctional tables, tables of the equation of time, and mental additions and subtractions.

The planar sundial disclosed herein enables the user to set up, align, and read the sundial while knowing only the sundial's approximate geographical location. It requires no expertise, no knowledge of latitude or longitude, nor of the equation of time, nor of magnetic declination, and without reference to external maps, tables, graphs, other data or mental calculations.

One exemplary embodiment of the present invention is a horizontal sundial designed for use anywhere in the continental United States. This embodiment comprises a solar dial having marked thereon curvilinear solar time indicia marking the hours from 4 a.m. to 8 p.m. Further included with these curvilinear solar time indicia are six concentric latitude indicia, one for each of the latitudes from 25 through 50 degrees north in five degree increments, the center of these indicia (the index point) being the vertex of the gnomon. The curvilinear solar time indicia are constructed and marked such that the intercept of each curvilinear solar time indicia with a concentric latitude indicia lies at the time-latitude intercept point of a line drawn according to the usual hour line equation for a horizontal sundial.

The hour line equation for a horizontal sundial yields the angle at which the hour line is to be drawn from the noon hour line, all such hour lines originating at the index point, is EQ. 1 previously set forth:

hour line angle from noon=arctan(sin(latitude)*tan (hours from noon*15)) EQ. 1

The hour lines for the above equation are normally drawn only once per hour for a horizontal dial, one line for each hour being drawn from the index point, which is the vertex of the gnomon, angularly spaced from the noon hour line, which is the longitudinal axis of the sundial defined by the index point and the noon hour point.

In an exemplary embodiment, the above hour line equation is computed six times for each hour line using, in turn, the latitudes 25 through 50 in five degree increments. The six resulting hour line angles from the longitudinal axis are then constructed from the index point to the outer edge of the solar dial. The time-latitude intercept of each latitude specific hour line with that latitude indicia is then noted. These six time-latitude intercept points define the curvilinear solar time indicium for that hour. In this embodiment, these six time-latitude intercept points serve to define a curvilinear arc, that is, a curvilinear solar time indicium, such that the user is afforded a ready visual interpolation of the position of the curvilinear solar time indicia in the bands between the latitude indicia. Alternate less preferable methods of indicating the six time-latitude intercept points are possible, such as stair step, radials, or hash marks.

In the embodiment intended for use in the continental United States, a number of latitude map indicia are further included with the field of curvilinear solar time indicia and latitude indicia such that the latitude indicia cross geographic locations on the latitude map indicia where the usual latitude lines of the map indicia would so cross. The latitude indicia are further provided with numeric indicia which correspond to the latitude represented and hence to the required angle of the gnomon.

This sundial apparatus further employs a gnomon to cast the sun's shadow on the solar dial. It is well known that in the case of a horizontal sundial the angle of the gnomon must be set to the angle of latitude of the sundial's location. In the embodiment described, the gnomon is supported by a gnomon support erected perpendicular to the surface of the solar dial, with the face of the gnomon support being aligned perpendicular to the solar dial's noon hour line. The gnomon support is numerically marked to indicate the setting required for the gnomon angle consistent with the numeric labels of the latitude indicia.

The user, knowing his approximate geographic location, and making reference to the latitude map indicia on the solar dial and the numeric indicia provided with the latitude indicia, can readily determine the numeric setting required for the gnomon angle.

To further assist the user in setting the correct gnomon angle, the gnomon support is provided with a gnomon support map indicium, here being a map of the continental United States, which gnomon support map indicium is so scaled and placed such that when the gnomon is angled at the user's location on the gnomon support map indicium, the gnomon is then set to the required latitude angle.

An alternate embodiment provides the gnomon support map indicium on the gnomon support and the numeric markings provided therewith as the means by which the user identifies his geographic location for telling time. The latitude map indicia on the solar dial are eliminated, but the numeric indicia on the latitude indicia are retained. The user, knowing his approximate geographic location, and making reference to the gnomon support map indicium and associated numeric indicia and the numeric indicia provided with the latitude indicia, can readily determine his geographic location on the solar dial and thus read the time.

In the exemplary embodiment of the present invention are further provided means to convert apparent solar time to clock time. To accomplish this conversion a rotatable clock dial is further provided on which the user reads the true clock time. In the course of the conversion from apparent solar time to clock time it is recognized by those skilled in the art that three additions or subtractions of time may be required, which can be reflected in the relative angular position of the clock dial 12 o'clock point and the solar dial noon hour point, viz., 1) the correction for the equation of time may add or subtract up to sixteen minutes from the clock;
2) the correction for daylight saving time may add sixty minutes to the clock; and
3) the correction for time zone position may, in the general sense, add or subtract up to sixty minutes from the clock.

From the above it is clear that if the clock dial is to be rotated relative to the solar dial to accomplish the three above-described corrections then the clock dial must be visually connected to the solar dial's curvilinear solar time indicia in a way which is consistent over plus two hours and 16 minutes, or minus one hour and 16 minutes of rotation. In the exemplary embodiment the inner latitude indicium has been assigned to 50 degrees north latitude, this being the preferred assignment as the angular divergence of the curvilinear solar time indicia is lower at higher latitudes. Thus, from the 50 degree north latitude indicium the curvilinear solar time indicia can be extended by aesthetically pleasing extension indicia to intercept the hour indicia on the clock dial. Now the clock dial can be rotated with respect to the solar dial through the necessary hours while still visually aligning to the solar dial.

The conversion to clock time can be accomplished by various means. In one embodiment the user simply rotates the clock dial relative to the solar dial using an external timekeeper, such as a wrist watch, so that the clock dial time matches wrist watch time. While the sundial remains in the same geographic location this offset between solar dial time and clock dial time will hold true, at least for many days, until errors from the equation of time creep in and a new setting, by reference to a timekeeper, will need to be made to account for the equation of time error.

In another embodiment the user rotates the clock dial relative to the solar dial using longitude indicia (preferably on the clock dial) and time zone indicia (preferably on the solar dial) to determine the required offset. This corrects for longitude displacement from the time zone meridian, and for standard time and daylight saving time. It does not, however, account for the equation of time error, which can be as much as fifteen minutes. The user can either accept the possible fifteen minute error, or make a final correction, again with reference to an external timekeeper. While the sundial remains in the same geographic location, this offset between solar dial time and clock dial time will hold true, at least for many days, until errors from the equation of time creep in and a new setting, by reference to a timekeeper, will need to be made to account for the equation of time error.

In an embodiment the time zone indicia are not placed on the solar dial as described above but are placed instead on an arcuate means, the equation of time (EOT) slider, which slides relative to the solar dial. This sliding means is indexed to an equation of time graph indicium, being a graphical representation of the error in minutes owing to the equation of time plotted against calendar months, which serves to position the time zone indicia by calendar month to account for the equation of time error. In this embodiment the user rotates the clock dial relative to the solar dial using longitude indicia on the clock dial and time zone indicia on the EOT slider, the EOT slider being previously positioned to the equation of time graph indicium on the solar dial. In this embodiment no external timekeeper is required to set the clock dial correctly with respect to the solar dial. While the sundial remains in the same geographic location this offset between solar dial time and clock dial time will hold true, at least for many days, until errors from the equation of time creep in and a new setting, by moving the EOT slider, will need to be made.

From the foregoing it is recognized that each of the three required corrections, being equation of time, time zone, and daylight saving time, as stated previously, can be viewed as a displacement in longitude. These corrections are achieved by means of the EOT slider located adjacent to the clock dial. The EOT slider is indexed to a graph of the equation of time. When the EOT slider is positioned appropriately with respect to the equation of time graph indicium it provides the proper equation of time offset.

The time zone map indicium provided on the clock dial then serves, by means of included longitude indicia and time zone meridian indicia, as an alignment mechanism between the adjusted EOT slider and the clock dial, there being provided indicia on the EOT slider for both standard time (ST) and daylight saving time (DST) for such purpose. The resulting rotational alignment sets the clock dial to the proper lag or lead with respect to the solar dial to complete the correction from apparent solar time to mean solar time to local time.

Assigning the time zone map indicium to the clock dial and assigning the time zone meridian indicia to the solar dial, or on the EOT slider which is effectively a moveable extension of the solar dial, is an embodiment that is most convenient for a user viewing the sundial from the preferential 12 noon perspective (that is, looking north along the solar dial noon hour line). The assignment can be reversed if desired to support or create an alternate preferential perspective.

For the purpose of true north alignment an exemplary embodiment of the present invention further provides a magnetic compass whose north-south axis is aligned to the solar dial's noon hour point. To provide for correction of the magnetic compass declination the apparatus further provides a magnetic compass declination map indicium preferably located at the south axis of the magnetic compass, the magnetic compass declination map indicium having magnetic compass declination lines marked thereon. The user first orients the sundial such that the north-pointing magnetic compass needle is pointing roughly at the marked north axis of the magnetic compass. The user then rotates the sundial such that the south pointing end of the magnetic compass needle points to the line of magnetic compass declination running through the user's location on the magnetic compass declination map indicium.

For the purpose of leveling, the sundial includes two spirit levels with three threaded leveling feet to make any required leveling adjustment. A standard tripod mounting threading can also be provided to serve in place of the leveling feet, if desired. Alternate level indicating means, such as a single bubble level or plumb bob, are equivalent to the two-spirit-level solution in the embodiment shown. Alternate leveling means using, for example, fewer or more feet, or shims in place of feet, are equivalent to the three-threaded-leveling-feet solution mentioned.

In an alternative embodiment of the present invention, both the gnomon and the gnomon support are made removable and means for stowing both lying flat on the sundial's surface are provided for easy transport.

In another embodiment, the user is provided with a token, similar to a playing piece for a board game, which token the user can set on the gnomon shadow's intercept with the user's latitude to assist the eye in following the indicia.

With the sundial thus properly calibrated the user reads the local time by first noting where the gnomon's shadow crosses the user's latitude (which may lie on a point between two latitude indicia) as seen from the latitude map indicia overlaying the latitude indicia. The user now visually traces this time-latitude intercept along the path of the curvilinear solar time indicia (which may lie on a point between marked curvilinear solar hour indicia and curvilinear solar fractional hour indicia) and extension indicia across the solar dial to the clock dial. The time then indicated on the clock dial is the corrected local time.

BRIEF DESCRIPTION OF THE DRAWING

The above and other aspects, features, and advantages of the present invention will become more apparent upon consideration of the following detailed description, taken in conjunction with the accompanying drawing, wherein.

DETAILED DESCRIPTION OF EMBODIMENTS OF THE INVENTION

Figure 1:
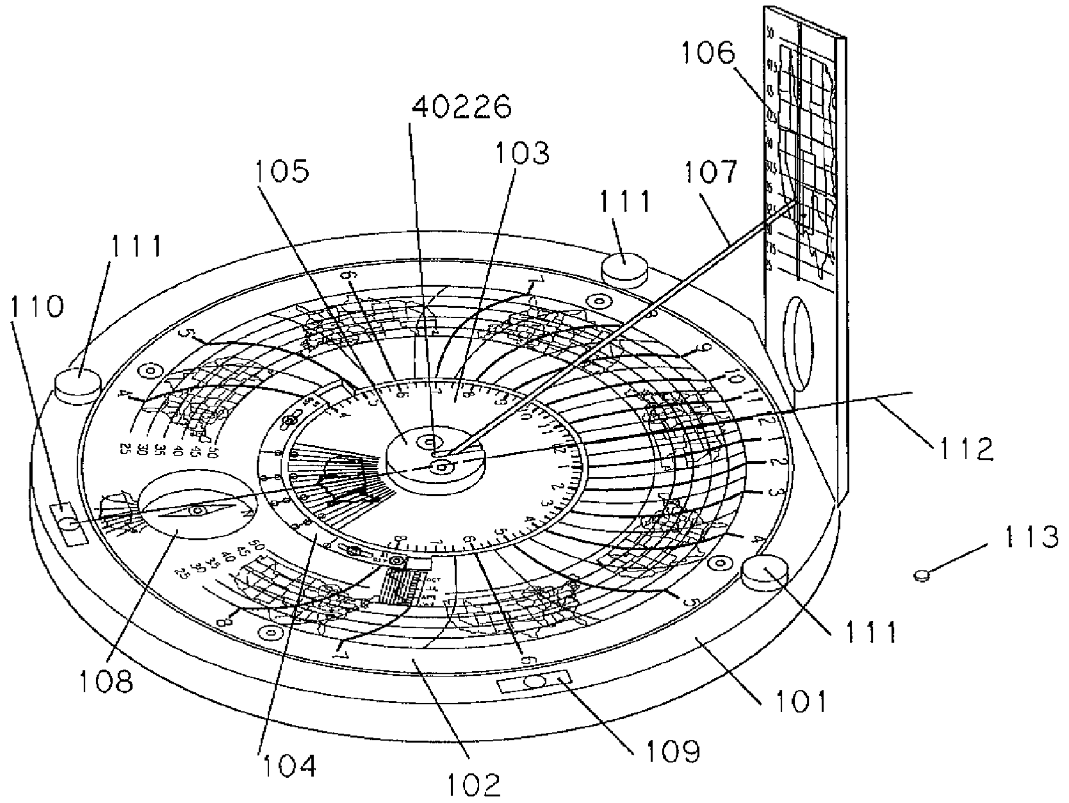
FIG. 1 is an isometric view of an exemplary sundial in accordance with an embodiment of the present invention.

Exemplary embodiments of the present invention are described below with reference to the drawing. It should be understood that the descriptions are presented by way of example only, and not limitation. Thus, the breadth and scope of the present invention should not be limited by the following-described exemplary embodiments, but should be defined only in accordance with the below claims and their reasonable equivalents.

Mechanical Description

The following section provides a mechanical description of an exemplary embodiment of the present invention. Those skilled in the art recognize that alternate mechanical implementations are possible which achieve the same functionality.

With reference to the isometric drawing of FIG. 1, base 101 supports the exemplary embodiment of the present invention. Solar dial 102 is preferably recessed into and securely mounted upon the base. Clock dial 103 is preferably recessed into and pivotably mounted upon the solar dial. Equation of time (EOT) slider 104 is preferably recessed into and slidably mounted upon the solar dial. Top cap 105 is securely mounted to base 101. Gnomon support 106 is vertically mounted to base 101 and is removable for compact transport of the sundial (see FIG. 9). Gnomon support 106 and top cap 105 provide means for supporting the opposite ends of gnomon 107. Magnetic compass 108 is sandwiched between base 101 and solar dial 102. Two spirit levels are employed in this embodiment. North-south spirit level 109 and east-west spirit level 110 are mounted in base 101. Three leveling feet 111 are mounted in base 101 and are adjusted by the top knobs as shown. Longitudinal axis 112 of the base is the line defined by solar dial index point 40226 (see FIGS. 1, 3 and 4), located at the center of top cap 105, and base noon hour point 20111 (see FIGS. 2 and 3). The longitudinal axis is perpendicular to gnomon support 106. Token 113 is provided to assist in reading the sundial, as will be explained below.

Figure 2:
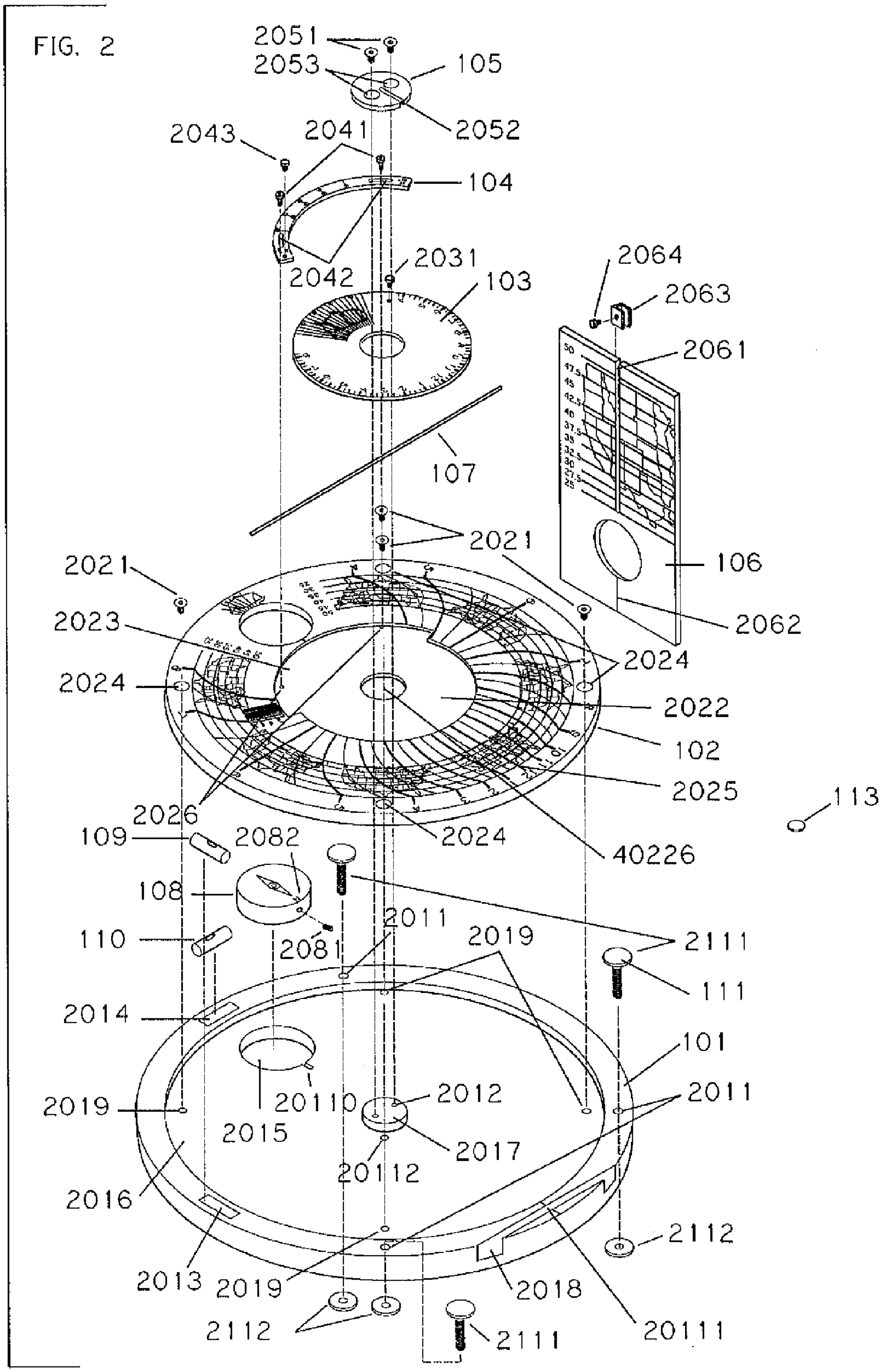
FIG. 2 is an exploded isometric view of the sundial of FIG. 1.

With reference now to FIG. 2, base 101 provides the mounting means for all the other components. The base is provided with three threaded holes 2011 to accept the three leveling feet 111. The leveling feet comprise an upper portion 2111, being a thumb screw and a threaded post, and a lower portion being foot 2112. The base is further provided with a ¼-20 threaded hole 20112 in the lower surface of the base to accommodate a standard tripod mount. The base is further provided with spirit level cavities 2013, 2014 to accommodate spirit levels 109, 110. The base is further provided with magnetic compass cavity 2015 to accept magnetic compass 108.

Base 101 has solar dial circular relief 2016 to inset solar dial 102. Central bearing post 2017 is centered within the solar dial circular relief. Clock dial 103 rotates around central bearing post 2017. The central bearing post has tapped holes 2012 to provide fastening of top cap 105 by means of threaded fasteners 2051 via through holes 2053. The top cap and the threaded fasteners together serve to secure the entire base assembly.

Solar dial 102 is mounted by means of threaded fasteners 2021 via through holes 2024 into matching threaded holes 2019 in base 101, thereby ensuring that solar dial noon hour point 2025 is aligned to longitudinal axis 112 (see FIG. 1) and base noon hour point 20111, and thus perpendicular to slot 2018 for gnomon support 106.

Base 101 and all other metallic components are preferably made of non-magnetic materials such as aluminum or brass so as not to interfere with the reading of the magnetic compass. Those skilled in the art recognize that it is possible to make the base and the solar dial as one piece. However, the two piece design as shown in the exemplary embodiment is preferred in that it allows, for example, the base to be made of aluminum while the solar dial can be made of brass. The two-piece design also serves to sandwich the magnetic compass securely between the base and the solar dial.

Magnetic compass 108 is installed in compass cavity 2015 beneath the solar dial. North indicator 2082 of the magnetic compass is aligned with longitudinal axis 112 (see FIG. 1) and solar dial noon hour point 2025 by means of compass alignment pin 2081 located in the body of the magnetic compass. The compass alignment pin is captured by compass alignment pin slot 20110 to ensure that the magnetic compass remains aligned to the solar dial noon hour point.

Clock dial 103 is mounted over central bearing post 2017 such that the clock dial can rotate around the central bearing post while sliding in clock dial circular relief 2022 provided in solar dial 102. A thumb screw 2031 or equivalent means is provided to allow for convenient manual rotation of the clock dial.

EOT slider 104 is mounted adjacent to the clock dial in the EOT slider arcuate relief 2023 and is slidably secured by two shoulder threaded fasteners 2041, running through slots 2042, the shoulder threaded fasteners being threaded into solar dial 102 by means of threaded holes 2026. A thumb screw 2043 or equivalent means is provided to allow for convenient sliding of the EOT slider.

The above arrangement utilizing reliefs 2022, 2023 in the solar dial to accommodate both clock dial 103 and EOT slider 104 is preferred in that the top surfaces of the solar dial, the clock dial, and the EOT slider are thereby made level, one to each of the others, eliminating parallax when reading across the three surfaces.

Gnomon support 106, being both removable and reversible, is vertically erected in gnomon support slot 2018. Gnomon support 106 is provided with two gnomon support map indicia 7065E and 7065W as shown in respective FIGS. 7A and 7B. In the exemplary embodiment shown, the two map indicia are a first map indicium of the eastern United States, 7065E, and a second map indicium of the western United States, 7065W. Center line 2062 in the gnomon support is aligned with matching base noon hour point 20111, both of which are aligned to solar dial noon hour point 2025 and longitudinal axis 112. It is preferred that a single gnomon support be imprinted with map indicia on opposite sides, but two separate gnomon supports for the halves of the United States, as shown, could be used.

The first or proximal end of gnomon 107 is located at the index point 40226 (see FIGS. 1, 3, and 4) when set into slot 2052 in top cap 105, the top cap gnomon slot being aligned with solar dial noon hour point 2025. The second or distal end of gnomon 107 extends through gnomon support slot 2061 in gnomon support 106. The gnomon rests in place with one end at index point 40226, being the center of solar dial 102 such that the lower edge of the gnomon, which in the exemplary embodiment is a cylindrical rod, is at the same level as the top surface of the solar dial. The opposite end of the gnomon passes through the gnomon support slot 2061. The line of the longitudinal axis and the line of gnomon support slot 2061 together define a gnomon plane. The gnomon can be angularly adjusted around index point 40226 within the gnomon plane according to gnomon support map indicia 7065E, 7065W. Gnomon rest 2063, preferably in the form of a U-channel adapted to slide in gnomon support slot 2061, is provided with thumb screw 2064 or equivalent means to secure it in place, to retain the gnomon at the desired angle. This gnomon rest functions as a variable height gnomon support means.

Token 113 is provided for the user's convenience in noting the time-latitude intercept of the gnomon's shadow in the user's band of latitude.

Time Marking Description

The following section provides a description of the time marking features of the exemplary embodiment of the present invention. Those skilled in the art recognize that alternate marking implementations are possible to achieve the same functionality.

With reference to FIG. 1, solar dial 102, when level and north-pointing, together with gnomon 107, when set at the correct angle, being the latitude of the sundial's geographic location, operates as a horizontal planar sundial telling apparent solar time. The primary function of the solar dial is to adapt the unequiangular horizontal planar sundial to operate over a range of latitudes without reference to external sources.

Figure 3:
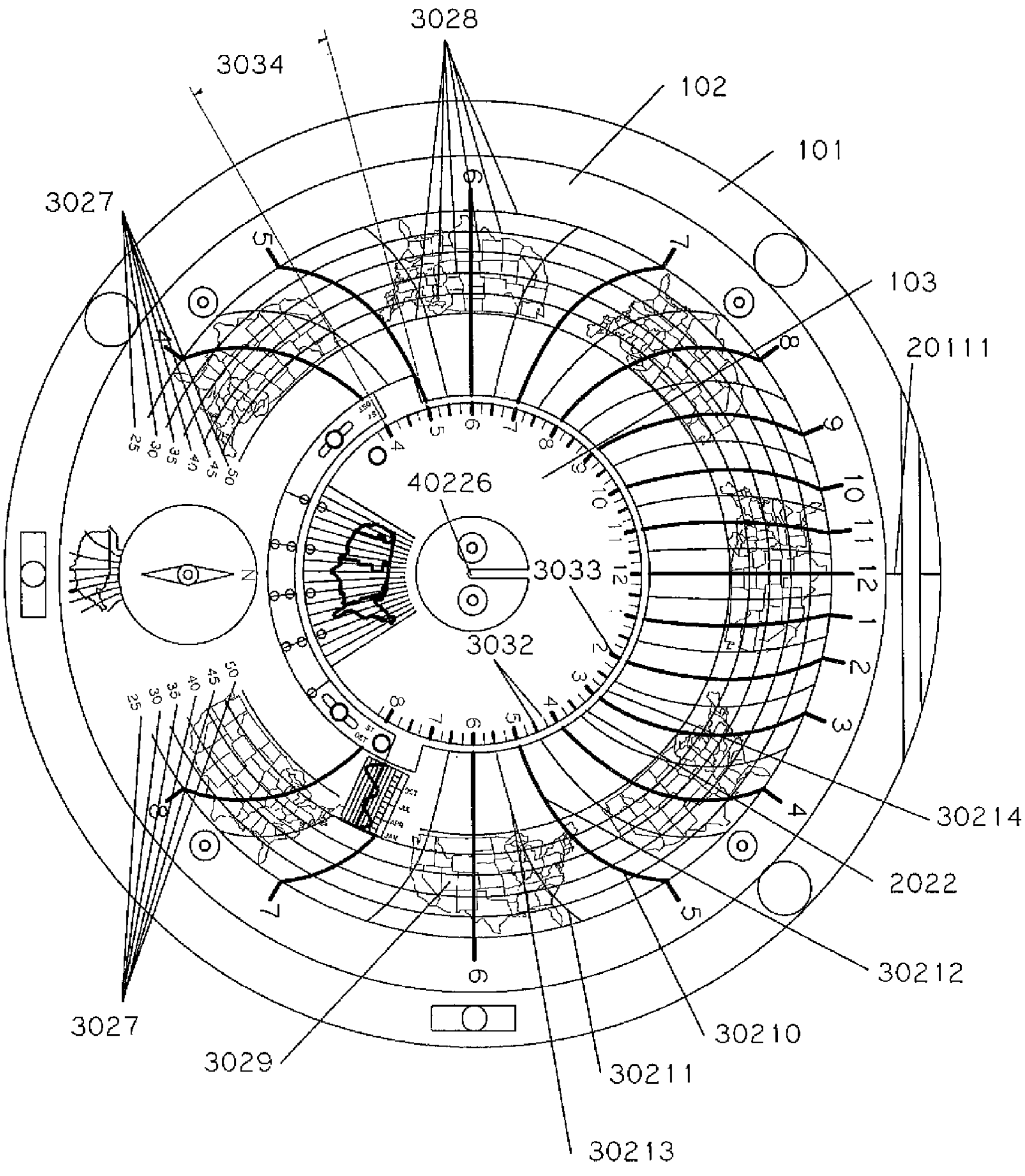
FIG. 3 is a top view of the sundial of FIG. 1.

With reference now to FIG. 3, in the exemplary embodiment, being intended for use in the continental United States, solar dial 102 is marked with six latitude indicia 3028, the latitude indicia being concentric circular arcs representing the latitudes 25 north through 50 north in five-degree increments, each latitude arc having its center at index point 40226 of solar dial 102. In this exemplary embodiment latitude indicia 3028 are further numerically labeled, consistent with the latitude represented, at each terminus 3027.

From the 25 north latitude indicium to the 50 north latitude indicium are drawn curvilinear solar hour indicia 30210 (heavier lines) for each hour, and curvilinear fractional solar hour indicia 30211 (thinner lines) for each fractional hour (collectively "curvilinear solar time indicia"). The curvilinear fractional solar hour indicia illustrated represent half hours, although quarter hours or even smaller fractional markings can be provided.

Figure 4:
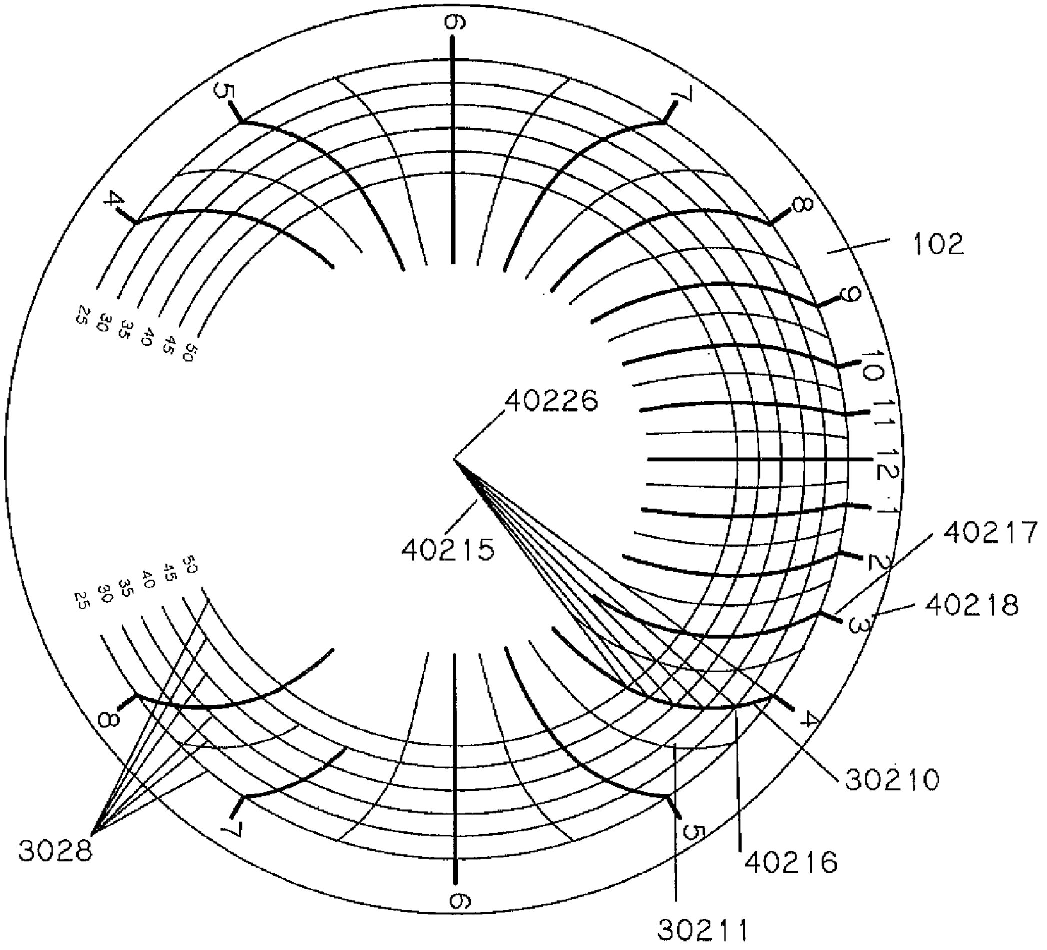
FIG. 4 illustrates a method for construction of the curvilinear solar time indicia on the solar dial of the sundial of FIG. 1.

With reference to FIG. 4, curvilinear solar hour indicia 30210 and curvilinear fractional solar hour indicia 30211 are constructed on solar dial 102 using the usual hour line equation for a horizontal sundial, as previously set out:

$$\text{hour angle from noon}=\arctan(\sin(\text{latitude})*\tan(\text{hours from noon}*15)) \qquad \text{EQ. 1}$$

To construct each curvilinear solar time indicium 30210, 30211, EQ. 1 is solved six times for each curvilinear solar time indicium, one solution for each of the six latitudes represented by the six latitude indicia 3028. These solutions are drawn angularly offset from longitudinal axis 112 (see FIG. 1), containing solar dial noon hour point 2025 (see FIG. 2), as construction lines 40215 from index point 40226 of solar dial 102 to time-latitude intercept point 40216 on the latitude indicium pertaining to each construction line. Time-latitude intercept points 40216 are then connected by a curvilinear line 30210, 30211 from the 25 north latitude indicium to the 50 north latitude indicium 3028. In the case of curvilinear solar hour indicia 30210 the indicia is further marked by hour line hash mark indicium 40217 and hour line numeric indicium 40218.

The number of latitude indicia, their southern limit and northern limit, and the spacing between them are selected according to the intended geographical coverage for the sundial. In the exemplary embodiment of the present invention the southern limit was selected to encompass the southern tip of Florida and the northern limit encompasses the Canadian border. A five-degree spacing was selected to provide the user accurate location information without excessive detail. Given the range of latitudes incorporated in the embodiment shown, the hour range for the above computations and curvilinear solar time indicium construction was chosen to range from 4 a.m. to 8 p.m., this being both symmetrical and sufficient for hours of daylight expected over these latitudes. A sundial constructed in accordance with the present invention intended for use in western Europe ranging from northern Scotland to southern Italy could be provided with a range of 35 degrees north to 60 degrees north, for example.

Referring again to FIG. 3, embedded within latitude indicia 3028 are a plurality of latitude map indicia 3029, being maps of the continental United States. The preferred projection for these latitude map indicia is a mercator projection wherein the curved lines of latitude of the mercator map can be matched to and coincide with the latitude indicia 3028, such that said latitude indicia cross geographical locations on the latitude map indicia having corresponding latitude.

With regard to the combination of latitude indicia and mercator map indicia, it will be apparent to those skilled in this art that several equivalent combinations can be made. Concentric arcuate latitude indicia combined with mercator map indicia having latitude geometry matching the arcuate latitude indicia can, for example, be replaced with concentric octagonal latitude indicia combined with equirectangular map indicia (wherein the equirectangular map latitude lines are straight lines, and can be similarly overlaid on the octagonal latitude indicia). In such case one might chose to make base 101 and solar dial 102 in an octagonal form-factor rather than a circular one.

The sundial represented by the foregoing exemplary embodiment, being comprised of base 101, solar dial 102, gnomon support 106, the gnomon support being adjusted to the latitude angle according to numerical indicia 7066 (see FIG. 7) thereon, further matched to latitude numeric indicia 3027 corresponding to latitude map indicia 3029, thereby setting gnomon 107 at the latitude angle of the user's geographic location, is a functioning sundial. The sundial is able to indicate apparent solar time as the shadow cast by gnomon 107 intersects with a curvilinear solar time indicium 30210, 30211 (whether marked or implied) at the user's latitude, this latitude being determined by reference to latitude map indicia 3029 and latitude indicia 3028 over a range of latitudes.

Apparent Solar Time to Clock Time Linkage

Curvilinear solar time indicia 30210, 30211 are connected by a further set of extension indicia 30212, 30213 to outer rim 30214 of the clock dial circular relief 2022 adjacent to the outer rim of clock dial 103. Extension indicia 30212, 30213 are drawn such that curvilinear solar time indicia 30210, 30211 intercept clock dial 103 outer rim at 15 degree intervals 3034, which corresponds to the angular separation of hour indicia 3033 on the clock dial. Extension indicia 30212, 30213 need not be computed, but are drawn in an aesthetically pleasing fashion from the ends of curvilinear solar time indicia 30210, 30211 at the 50 degree latitude indicium to corresponding hour indicia 3033 or fractional hour indicia 3032 on the clock dial.

With further reference to FIG. 3, clock dial 103 (see FIG. 1) is marked with hour indicia 3033 and fractional hour indicia 3032 (collectively "clock time indicia") around its outer rim. Unlike unequiangular solar dial 102, clock dial 103 is equiangular with 15 degrees 3034 representing one hour as is typical for a 24-hour military clock, with fractional hours being marked at the appropriate fraction thereof. These clock time indicia align with extension indicia 30212, 30213 visually connecting the unequiangular solar dial curvilinear solar time indicia 30120, 30211 to equiangular clock time indicia 3033, 3032.

Clock dial 103 thereby links the apparent solar time as indicated on solar dial 102 to clock time on the clock dial (if the equation of time and any longitude induced errors and daylight saving time induced differences are ignored, corrections for which are discussed below).

In all but rare instances are apparent solar time as indicated by the gnomon's shadow on the solar dial, and clock time, as indicated by an external timekeeper, the same time, owing to the previously cited error sources. Consequently a means for adjusting the clock dial relative to the solar dial is required. With equiangular clock dial 103 visually connected to unequiangular solar dial 102 by means of the extension indicia 30212, the required adjustment is readily achieved by rotating the clock dial 12 o'clock point 50315 (see FIG. 5) relative to the solar dial noon hour point 2025 (see FIG. 2), which serves to adjust all hours on the clock dial equally.

The sundial represented by the foregoing exemplary embodiment, being comprised of base 101, solar dial 102, clock dial 103, gnomon support 106, the gnomon support being adjusted to the latitude angle according to numerical indicia 7066 (see FIG. 7) thereon, and further matched to the latitude numeric indicia 3027 corresponding to the latitude map indicia 3029, thereby setting gnomon 107 at the latitude angle of the user's geographic location, is a functioning sundial telling apparent solar time as the shadow cast by the gnomon intersects with a curvilinear solar time indicium 30210, 30211 (whether marked or implied) at the user's latitude. This user's latitude is determined by reference to latitude map indicia 3029 and latitude indicia 3028 over a range of latitudes, and further telling clock time, subject to the user adjusting the clock dial by reference to an external timekeeper, such as a wrist watch, to provide correction for longitude and daylight saving time, with periodic re-adjustments required to account for the equation of time error.

Figure 5:
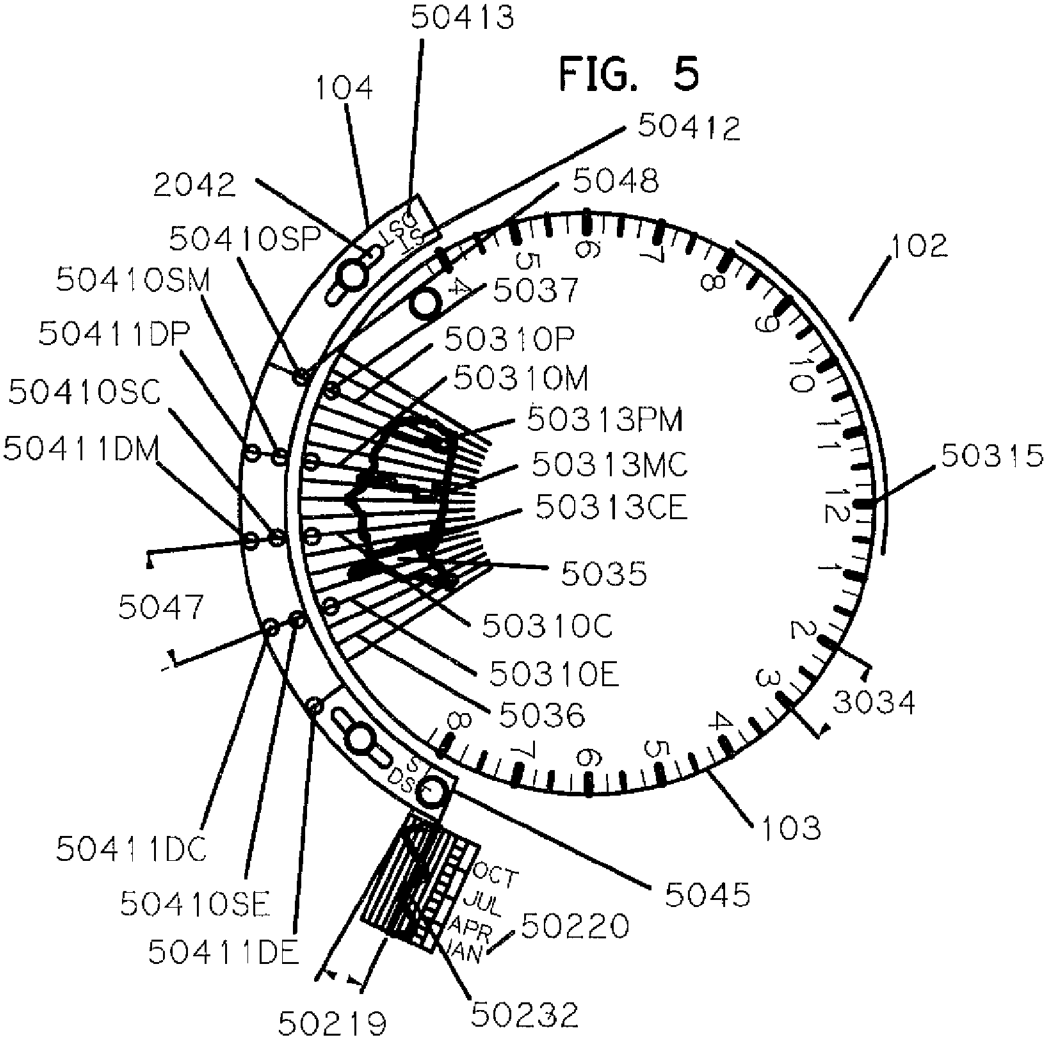
FIG. 5 illustrates the means for the equation of time and longitude correction in the sundial of FIG. 1.

With reference now to FIG. 5, in the exemplary embodiment of the present invention intended for use in the continental United States, the clock dial is laid out with 15 degrees 3034 representing one hour. The choice of 15 degrees for one hour determines: 1) the size of time zone map indicium 5035; 2) the spacing of longitude line indicia 5036; 3) the spacing of the time zone meridian indicia 50410Sx, 50411Dx; and 4) the angular size of the equation of time graph indicium 50219. For an example of using the principals of this sundial at a different location on the earth's surface, if such is desired, for use across northern Africa, from 20 degrees west to 50 degrees east longitudes, it might be aesthetically desirable to choose a 12 degree hour interval rather than 15 degrees, scaling the time zone map indicium, longitude line indicia, time zone meridian interval and the equation of time graph indicium accordingly.

Longitude Error Correction

The time zone map indicium 5035, preferably located at the 12 midnight area of clock dial 103, serves in the correction of longitude errors. Time zone map indicium 5035, which is preferably a polar projection wherein longitude lines are represented as straight lines with a common vertex, is drawn together with a plurality of longitude line indicia 5036 spaced at 3.75 degrees (this being equal to 15 minutes of time), as 15 degrees 3034 represents one hour on the clock dial. Of the longitude line indicia 5036, four coincide with the time zone meridians of time zone map indicium 5035. The time zone meridians are identified as Pacific time zone meridian 50310P, Mountain time zone meridian 50310M, Central time zone meridian 50310C, and Eastern time zone meridian 50310E. These are the four lines of longitude at 120°, 105°, 90°, and 75° west, respectively, by which time is measured in each of the four mainland or "lower 48" United States time zones. These four time zone meridian indicia 50310P, 50310M, 50310C, 50310E are denoted by the addition of indicia in the form of circles 5037 to distinguish them from the longitude lines indicia 5036. The three United States time zone boundaries, being the Pacific/Mountain boundary 50313PM, the Mountain/Central boundary 50313MC, and the Central/Eastern boundary 50313CE, are also shown on the time zone map indicium 5035 to assist the user in locating his time zone by visual geographic reference.

The source of and correction for longitude error will now be explained. If one is physically located on or very near a time zone meridian then the apparent solar time will match the local clock time (ignoring for the moment equation of time errors and daylight saving time). However, if one is, for example, ten degrees west of a time zone meridian (for example, in west Texas in the Central time zone) then the apparent solar time will lag the time zone time since the sun will be later in arriving at the local meridian. To compensate for this effect the user rotates clock dial 103 to align the user's longitude line indicium 5036 (whether marked or implied) on time zone map indicium 5035 to the applicable EOT slider 104 time zone meridian indicium. EOT slider 104 provides two sets of time zone meridian indicia, the first set being for standard time 50410Sx and the second set being for daylight saving time 50411Dx, as will be described in further detail in the following section. In the example pertaining to a user in west Texas, the user would then rotate clock dial 103 counterclockwise, making the clock dial lead solar dial 102 and thus correcting for the lag observed by the user's westerly displacement from the time zone reference meridian.

The EOT Slider Longitude Correction

Continuing with FIG. 5, as noted above, longitude correction is achieved by aligning the user's local meridian indicium 5036 (whether marked or implied) on time zone map indicium 5035 with the applicable EOT slider 104 time zone meridian indicium 50410Sx, 50411Dx. The EOT slider time zone meridian indicia is specially denoted by indicia in the form of circles 5048 to visually infer alignment to the circles 5037 on the time zone meridian indicia and further labeled DST 50413 and ST 50412, respectively, to denote daylight saving time and standard time. Two functions are thus provided by EOT slider 104; correction for daylight saving time and correction for the equation of time.

The EOT Slider Standard Time (ST) and Daylight Saving Time (DST) Correction

The inner rim of EOT slider 104 is marked with four time zone meridian indicia highlighted by circle indicia 5048. These four time zone meridian indicia are Pacific standard time zone meridian indicium 50410SP, Mountain Standard Time zone meridian indicium 50410SM, Central Standard Time zone meridian indicium 50410SC, and Eastern Standard Time zone meridian indicium 50410SE. A second set of four time zone meridian indicia on the outer rim of the EOT slider are likewise denoted by circle indicia 5048. These four time zone meridian indicia are the Pacific daylight saving time zone meridian indicium 50411DP, Mountain daylight saving time zone meridian indicium 50411DM, Central daylight saving time zone meridian indicium 50411DC, and Eastern daylight saving time zone meridian indicium 50411 DE. The four EOT slider 104 daylight saving time zone meridian indicia, 50411DP, 50411DM, 50411DC, 50411DE, are offset by fifteen degrees 5047 from the EOT slider standard time zone meridian indicia, 50410SP, 50410SM, 50410SC, 50410SE, to account for the one hour change from standard time to daylight saving time. This is consistent with the fifteen degree angular spacing 3034 of hour indicia 3033 (see FIG. 3) on clock dial 103.

Thus, if the user is in the Pacific time zone at or near the 120 degree west Pacific time zone meridian indicium 50310P while standard time is in effect, the user then aligns the Pacific time zone meridian indicium on time zone map indicium 5035 to the Pacific standard time zone meridian indicium 50410SP. If daylight saving time is in effect the user aligns the Pacific time zone meridian indicium on the time zone map indicium to the Pacific daylight saving time zone meridian indicium 50411DP. Since the Pacific daylight saving time zone meridian indicium 50411DP on the outer rim is displaced 15 degrees from its standard time counterpart 50410SP on the inner rim, clock dial 103 is thereby set one hour ahead of solar dial 102. Similarly, if the user is displaced from the time zone meridian the user aligns his longitude line indicium 5036 on time zone map indicium 5035 to the time zone meridian on EOT slider 104 from which time is measured in that time zone (either the standard time zone meridian indicia 50410Sx or the daylight saving time zone meridian indicia 50411Dx), and thus accomplishes both longitude correction and daylight saving time correction.

An alternative embodiment eliminates the EOT slider 104 with the EOT slider indicia marked instead on solar dial 102. This is the functional equivalent of making the EOT slider a non-sliding fixed entity, part of solar dial 102. The sundial represented by the foregoing alternate embodiment, being comprised of base 101, solar dial 102, having the indicia otherwise provided on the EOT slider, clock dial 103 (the clock dial having time zone map indicium 5035), gnomon support 106 (adjusted to the latitude angle according to numerical indicia 7066 thereon and further matched to latitude numeric indicia 3027 corresponding to latitude map indicia 3029, thereby setting gnomon 107 at the latitude angle of the user's geographic location), is a functioning sundial telling apparent solar time as the shadow cast by the gnomon intersects with a curvilinear solar time indicium 30210, 30211 (whether marked or implied) at the user's latitude. The user's latitude is determined by reference to latitude map indicia 3029 and latitude indicia 3028 over a range of latitudes. This embodiment further provides clock time over a range of latitudes and longitudes, and daylight saving time, subject to the periodic adjustment of the clock dial by reference to an external timekeeper, such as a wrist watch, to provide correction for equation of time error.

The EOT Slider Equation of Time Correction

In the embodiment of the present invention shown in FIG. 5, EOT slider 104 is a moveable entity, able to slide by means of slots 2042 clockwise or counterclockwise with respect to solar dial 102. The ROT slider is provided with an EOT slider index 5045, the slider index serving as a pointer onto the equation of time graph indicium 50232.

Equation of time graph indicium 50232 graphs equation of time error as the ordinate and calendar month 50220 as the abscissa. The ordinate is laid out such that 3.75 degrees 50219 represents 15 minutes of error, and is consistent with the angular spacing of hours on the clock dial, where one hour represents 15 degrees 3034. Those skilled in the art recognize that the equation of time typically produces an approximately plus or minus fifteen degree lead or lag between apparent solar time and mean solar time. When EOT slider index 5045 is aligned to equation of time graph indicium 50232 for the current month, the EOT slider standard time zone meridian indicia 50410Sx and daylight saving time zone meridian indicia 50411Dx are shifted either clockwise or counterclockwise, thus achieving the mean solar time correction.

Thus, the user first sets EOT slider index 5045 to the proper position on the equation of time graph indicium 50232, then sets the user's longitude line indicium 5036 on time zone map indicium 5035 to align to the time zone meridian indicia on the EOT slider for either standard time 50410Sx or daylight saving time 50411Dx. This accounts for the equation of time error, the longitude error, and the standard time/daylight saving time difference, by establishing a lead or lag of the clock dial 12 o'clock point 50315 to the solar dial noon hour point 2025 (see FIG. 2), thereby correcting for all three error sources.

This lead/lag correction from the apparent solar time indicated by solar dial 102 to the local time indicated on clock dial 103 is achieved without need for reference to any external sources, nor of calculations. This correction is achieved by making reference to time zone map indicium 5035, noting one's position with respect to the time zone meridian indicia 50310*x* and longitude line indicium 5036, and aligning one's position to the equation of time graph indicium 50232 adjusted EOT slider 104 time zone meridian indicia 50410Sx, 50411Dx.

The sundial represented by the foregoing exemplary embodiment, being comprised of base 101, solar dial 102, EOT slider 104, clock dial 103 (having the time zone map indicium 5035), gnomon support 106 (being adjusted to the latitude angle according to the numerical indicia 7066 thereon, and further matched to the latitude numeric indicia 3027 corresponding to the latitude map indicia 3029, thereby setting gnomon 107 at the latitude angle of the user's geographic location), is a functioning sundial telling apparent solar time as the shadow cast by the gnomon intersects with a curvilinear solar time indicium 30210, 30211 (whether marked or implied) at the user's latitude. The user's latitude is determined by reference to latitude map indicia 3029 and latitude indicia 3028 over a range of latitudes, and further telling clock time over a range of latitudes, longitudes, and daylight saving time, subject to the periodic adjustment by reference the equation of time graph indicium without need for reference to an external timekeeper.

Another alternative embodiment eliminates EOT slider 104 with the EOT slider indicia marked instead on solar dial 102. This is the functional equivalent of making the EOT slider a non-sliding fixed entity, part of the solar dial. The sundial represented by this alternate embodiment, being comprised of base 101, solar dial 102 having the indicia otherwise provided on EOT slider 104, clock dial 103 having time zone map indicium 5035, gnomon 107 and gnomon support 106, tells clock time over a range of latitudes, longitudes, and daylight saving time, with periodic adjustments required to account for the equation of time error.

The above described embodiments, wherein the time zone map indicium 5035 and associated indicia are on clock dial 103 and time zone meridian indicia 50410Sx, 50411Dx are on the solar dial 102 or, by extension, on EOT slider 104, and the equation of time graph indicium is on said solar dial, are preferred in that this arrangement provides the most intuitive arrangement for the user. It is recognized that alternate arrangements are possible, for example, exchanging all clock dial items with all solar dial items, such that the time zone map indicium is on the solar dial rather than the clock dial. These alternate arrangements are recognized as equivalents.

Gnomon Angle Setting

With reference now to FIG. 2, gnomon 107 which, in the exemplary embodiment, is in the form of a rod, rests on two points. One is index point 40226, being co-located in north-pointing gnomon slot 2052 in top cap 105, and the other is the top of gnomon rest 2063, being properly set and secured on the gnomon support 106. Gnomon rest 2063, which in the exemplary embodiment shown is a U-channel shaped aluminum piece tapped to accept thumb screw 2064, runs slidably in vertical slot 2061 in gnomon support 106. The gnomon rest, sliding in the gnomon vertical slot, is the functional equivalent of any variable height gnomon support means.

Figure 7A:
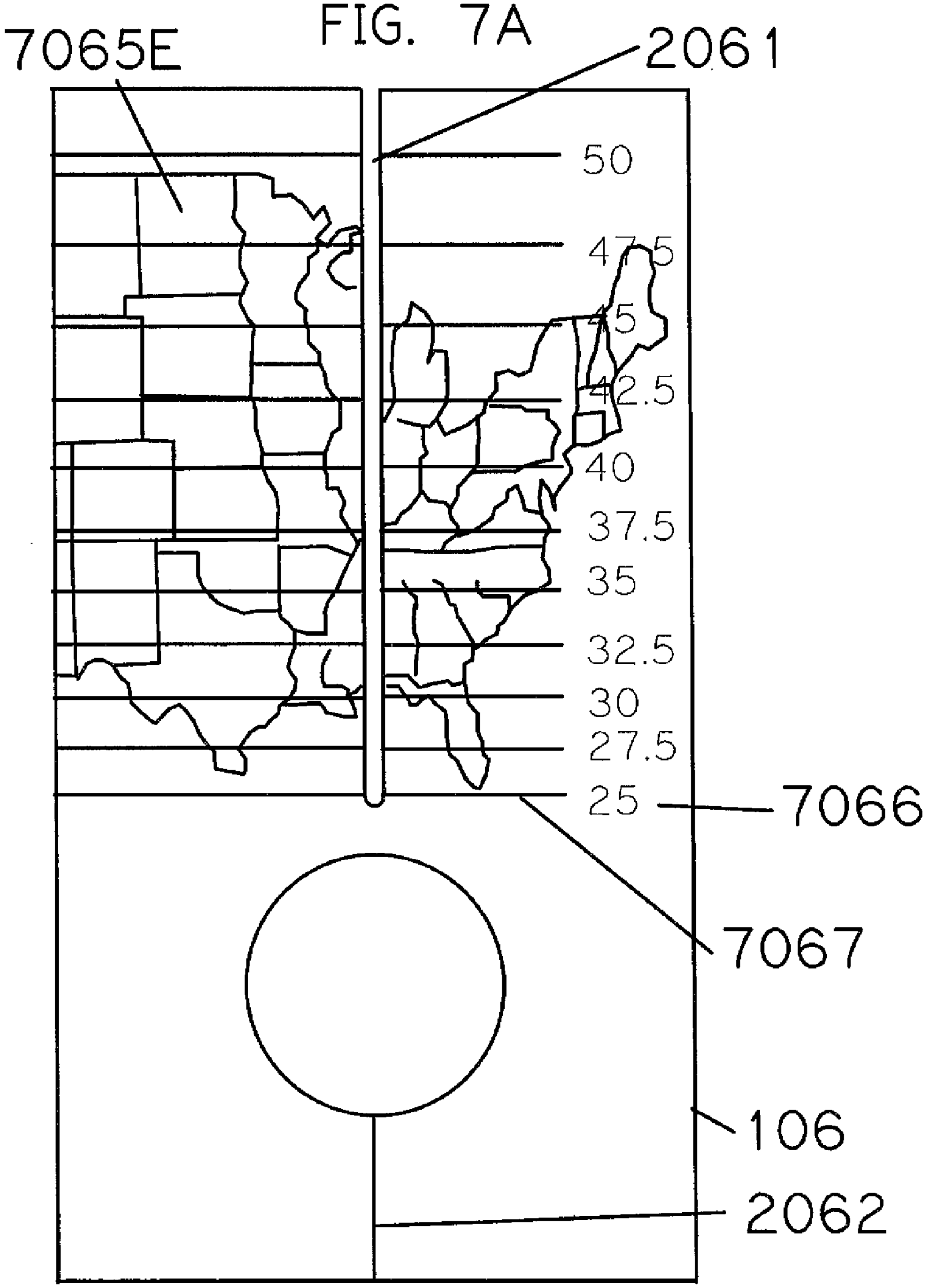
FIG. 7A is an enlarged side view of the means for supporting the gnomon of the sundial of FIG. 1.
Figure 7B:
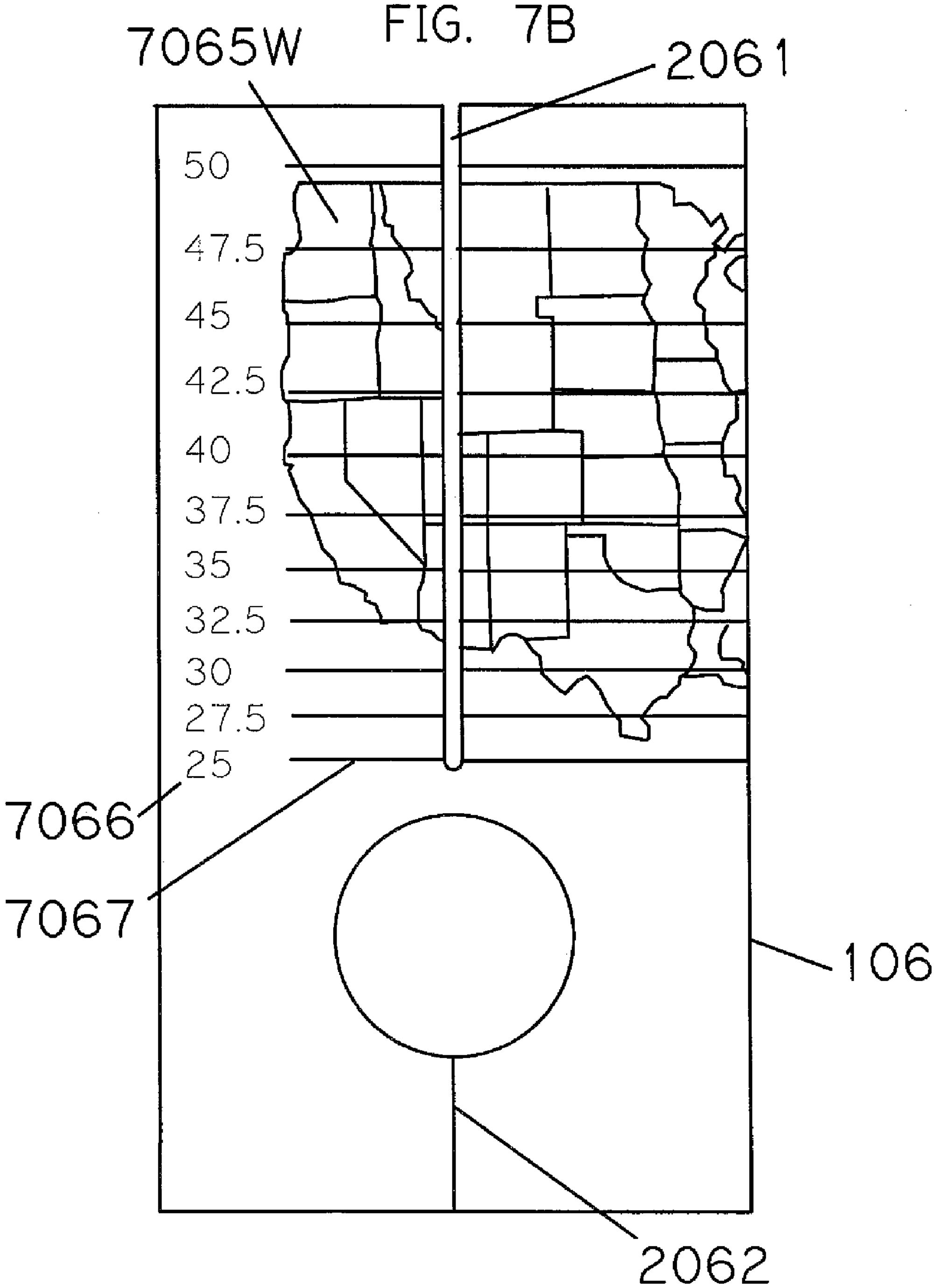
FIG. 7B is an enlarged side view similar to FIG. 7A with different indicia on the support means.

With reference to FIGS. 7A and 7B, gnomon support 106 is preferably provided with a gnomon support map indicium. In the exemplary embodiment the gnomon support map indicium is provided as one portion 7065W on one side of said gnomon support (see FIG. 7B), the other portion, 7065E, being on the opposite side (see FIG. 7A). The gnomon support can be reversed such that the correct portion of the gnomon support map indicium faces the center of the sundial when the gnomon support is erected in gnomon slot 2018 (see FIG. 2). The gnomon support map indicium is preferably derived from an equirectangular projection wherein lines of latitude are horizontal straight lines. This equirectangular projection is distorted in the north-south direction such that latitude line indicia 7067 are correctly angled from the surface of solar dial 102 (see FIG. 1). Thus, when the top of gnomon rest 2063 is set at the 40 degree line of latitude indicium 7067, the gnomon makes an angle of 40 degrees with the solar dial.

The gnomon support map indicia are further provided with numeric latitude indicia 7066 adjacent to the latitude line indicia 7067.

The user sets the gnomon angle by, firstly, moving gnomon rest 2063 up or down in gnomon support slot 2061 to a position which is horizontal to his current location on the gnomon support map indicium and, secondly, securing the gnomon rest in place with thumb screw 2064 (see FIG. 1). Gnomon support 106 is then erected in gnomon support slot 2018 (see FIG. 2) and gnomon 107 is set in place with one end in top cap gnomon slot 2052 (see FIG. 2) and the upper end atop gnomon rest 2063.

In the embodiment of the present invention shown, the solar dial latitude map indicia 3029, latitude indicia 3028, latitude numeric indicia 3027, gnomon support map indicia 7065E, 7065W, latitude indicia 7067, and numeric indicia 7066 are all provided for the user. Providing all of the above best serves the user in the two distinct tasks of telling of time and of setting the gnomon angle. The indicia provided on the solar dial are used to tell time, while the indicia provided on the gnomon support are used to set the gnomon angle. Alternate less convenient embodiments are possible which eliminate one or the other of the map indicium, leaving the user to reference one map, either on solar dial 102 or on gnomon support 106, and to translate his position by reference to the latitude indicia and corresponding numeric latitude indicia to the other surface.

Leveling the Sundial

As shown in FIG. 2, leveling of the sundial is accomplished by means of three leveling feet 111 threaded through base 101, with reference being made to spirit levels 109, 110. Alternatively, a tripod mount compatible ¼-20 threaded hole 20112 is provided in the bottom surface of base 101, allowing installation of the sundial on a tripod with leveling then made in a known manner by adjusting the tripod legs and head, again with reference to the spirit levels 109, 110. This is, of course, the functional equivalent of the leveling feet shown.

North-Pointing the Sundial

Figure 6:
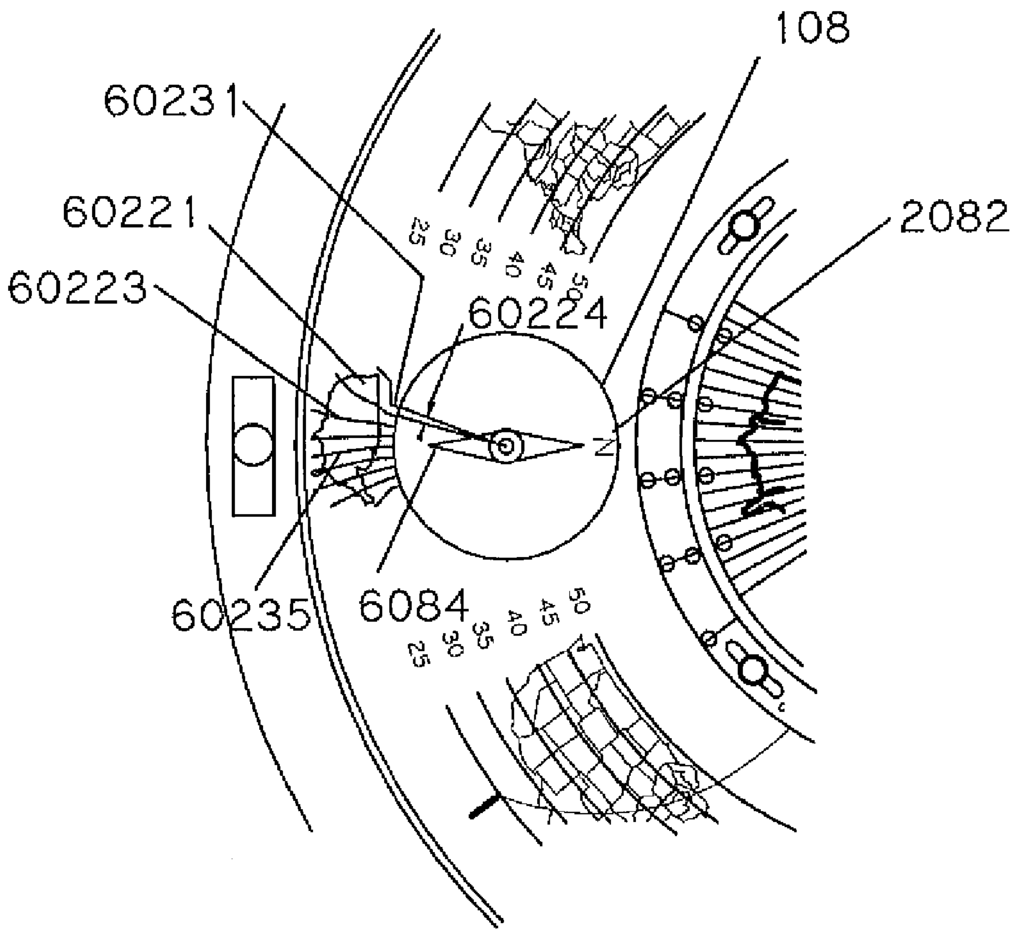
FIG. 6 is a partial view of the FIG. 1 embodiment showing a means for north-pointing provided by this embodiment.

Setting the sundial to north is accomplished through magnetic compass 108, together with magnetic compass declination map indicium 60221, as shown in FIG. 6. Magnetic compass declination map indicium 60221 is preferably a polar projection wherein lines of longitude are straight lines having a common vertex. In the continental United States zero declination agonic line 60235 runs roughly from eastern Minnesota to eastern Louisiana. This zero magnetic compass declination line indicium is marked on the magnetic compass declination map indicium 60221 and aligned opposite north indicator 2082 of the magnetic compass. Additional isogonic lines, magnetic compass declination indicia 60223, are further provided at five-degree intervals 60224, the additional magnetic compass declination indicia being connected by extension line indicia 60231 to the southern rim of the magnetic compass. Thus the user need only align the south pointing magnetic compass needle to point 6084 to the extension line indicia 60231 connected to the magnetic compass declination indicia 60223 (whether marked or implied) running through his location on the magnetic compass declination map indicium 60221 in order to achieve a true north setting of the sundial.

An alternative embodiment eliminates the magnetic compass declination map indicium 60221 and the other indicia associated therewith and requires the user to make the magnetic declination correction by reference to an external reference for his locale.

Collapsing the Sundial for Transport

Figure 9:
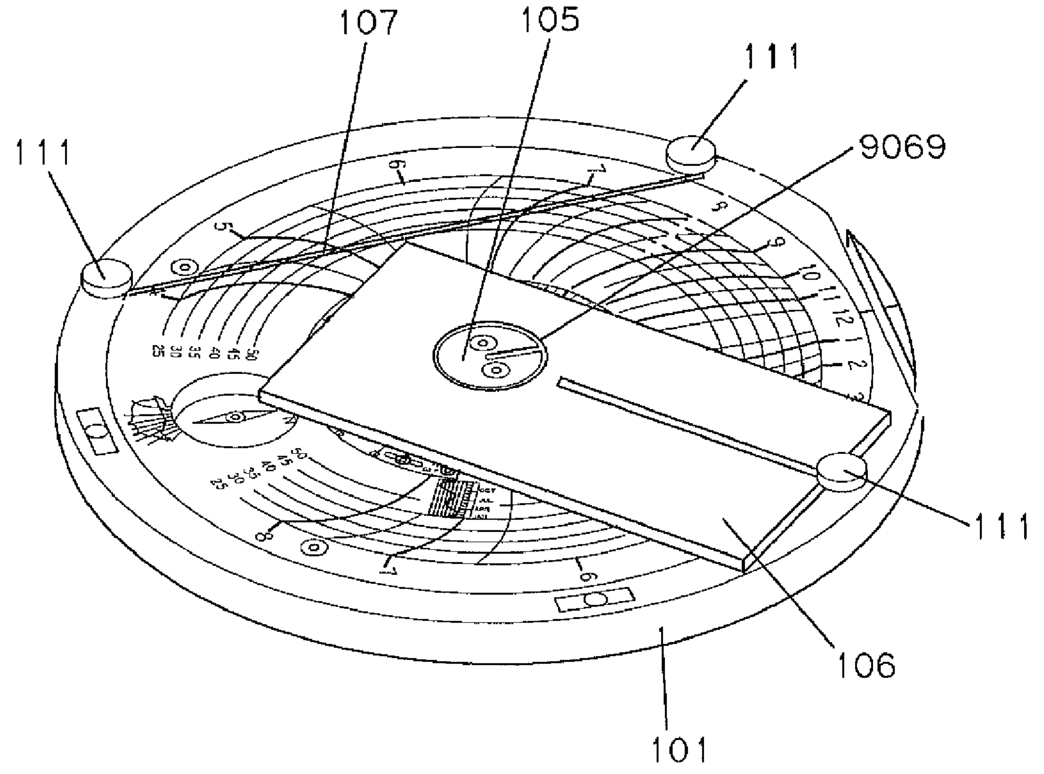
FIG. 9 illustrates the collapsibility of the sundial of FIG. 1.

As shown in FIG. 9, gnomon support 106 is provided with a through hole 9069 such that the gnomon support can be laid flat on base 101, with the through hole fitting over top cap 105. The gnomon support is then secured to the base by tightening one of the leveling feet 111 over the top surface of the gnomon support. Gnomon 107 is similarly laid flat on the base beneath two leveling feet 111 which secure the gnomon when tightened.

Using a Marker Token

Figure 8A:
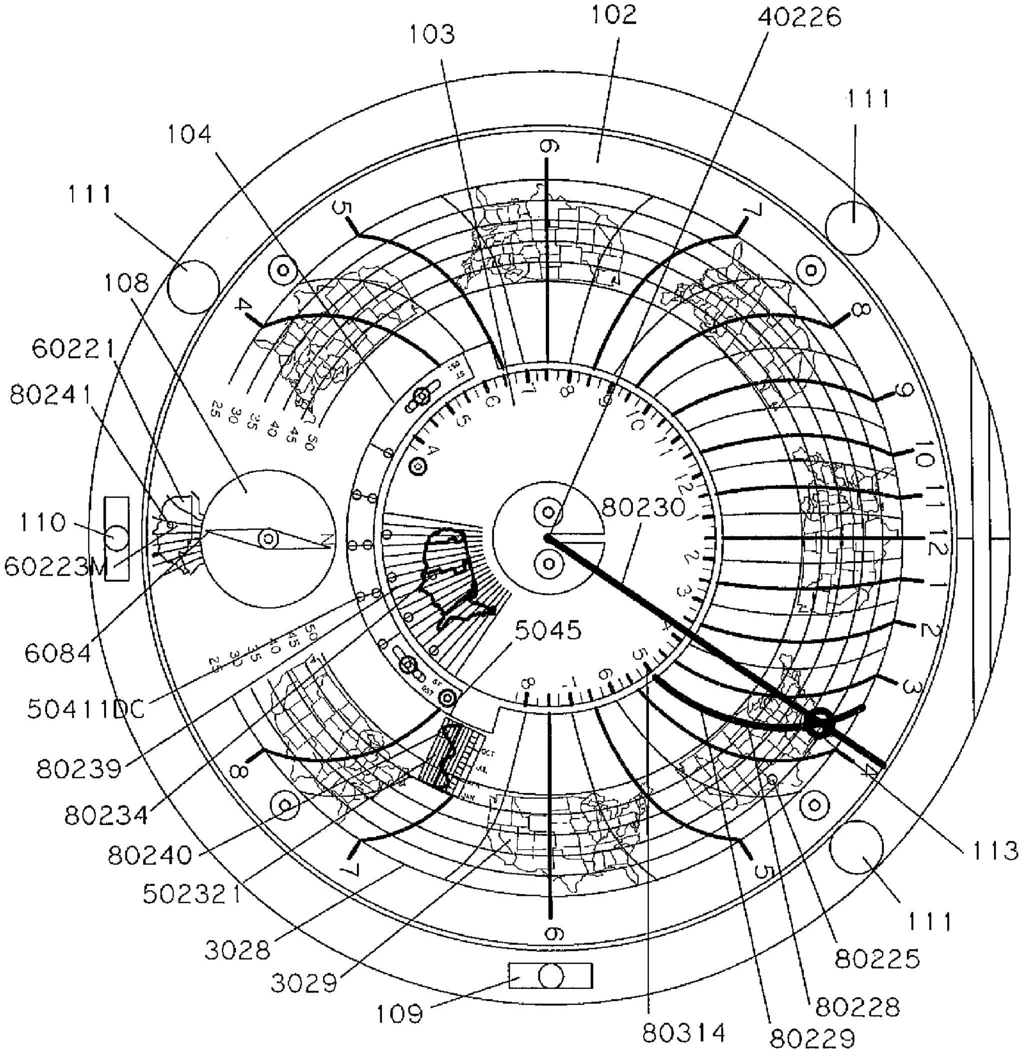
FIG. 8A is a top view illustrating the use of the sundial of FIG. 1.

With reference to FIG. 8A, to assist the user in telling time, the embodiment shown provides token 113, similar in form and appearance to a playing piece often found in board games. The user employs the token by sitting it on solar dial 102 where the shadow 80230 cast by gnomon 107 (see FIG. 1) crosses the user's latitude on the solar dial, as indicated by the latitude map indicium 3029 (the "shadow/latitude intercept"). Since shadow 80230 may not fall directly on a curvilinear solar time indicium 30210, 30211 (see FIG. 3), and the user may not be located directly on a latitude indicia 3028, placing the token at the shadow/latitude intercept makes it easier for the user to visually trace from the token's position along the implied arc of a solar time indicia 80228, further along an implied arc of an extension indicia 80229, to the clock time indicia 80314 on clock dial 103.

Usage Description Example

As a way to summarize the above details, a step-by-step usage example is provided for the preferred embodiment of the present invention for a user assumed to be located near Midland Tex. during the month of October.

1. Leveling

The user places the sundial on a relatively flat surface in a roughly north-pointing orientation in an area exposed to the sun and free from extraneous magnetic fields. While observing the two spirit levels 109, 110 the user adjusts the three leveling feet 111 until the spirit levels indicate that the apparatus is level.

2. North-Pointing

With reference to FIG. 8A, the user consults magnetic compass declination map indicium 60221, locating the approximate location 80241 of Midland, Tex., and orients the sundial such that south pointer 6084 points at the (implied) magnetic compass declination line 60223M running through Midland.

3. Gnomon Setting

Figure 8B:
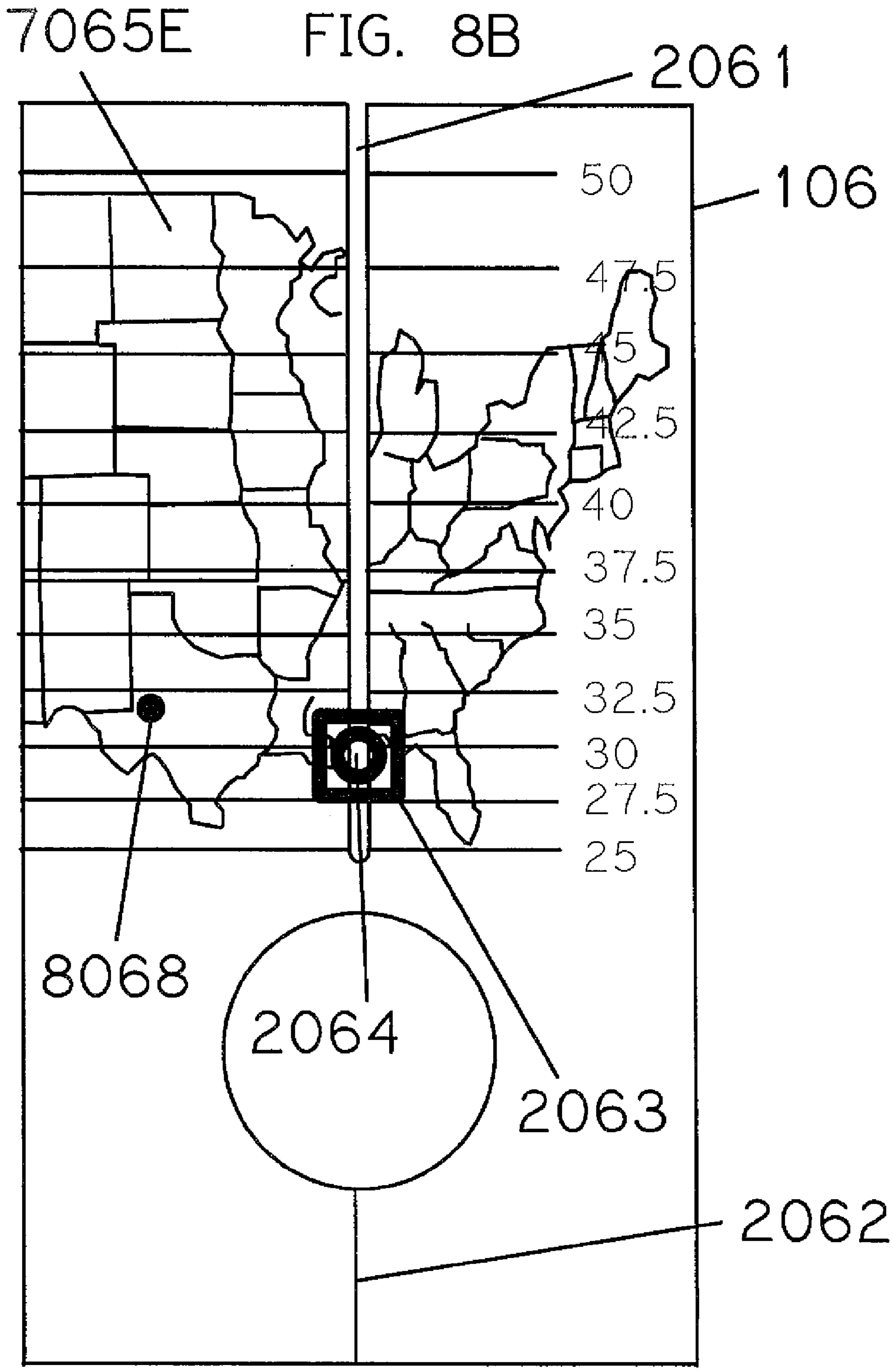
FIG. 8B is an enlarged side view similar to FIG. 7A.

With reference to FIG. 2 and FIG. 8B, the user selects the eastern side of gnomon support 106 and consults gnomon support map indicium 7065E and positions gnomon rest 2063 such that the top of the gnomon rest is parallel to the location 8068 of Midland on the gnomon support map indicium. The user secures the gnomon rest in place with thumb screw 2064 and erects the gnomon support in gnomon support slot 2018, aligning gnomon center line indicia 2062 with base noon hour point 20111. The user then rests gnomon 107 in top cap gnomon slot 2052 and atop the gnomon rest.

4. Equation of Time Correction

The user moves EOT slider 104 such that EOT slider index 5045 aligns with the ordinate of the equation of time graph indicium at the abscissa for October 80240, as shown in FIG. 8A.

5. Clock Correction

Also with reference to FIG. 8A, the user rotates clock dial 103 such that the implied time zone map indicium meridian 80239 nearest to Midland 80234 aligns with the DST Central time zone meridian indicium 50411DC on EOT slider 104.

6. Time Reading

The user places token 113 on solar dial 102 at the point where shadow 80230 of the gnomon crosses the location 80225 of Midland, which is the shadow-latitude intercept point. The user traces from the token along curvilinear solar time indicium 80228, along extension indicium 80229, to intercept point 80314 on clock dial 103. The corrected local time zone clock time can then be read on clock dial 103.

The result of the above set up, as shown in FIG. 8A, is that the apparent solar time indicated by the shadow-latitude intercept point denoted by token 113 is 3:30 p.m.

Those skilled in the art will recognize that the following corrections from apparent solar time to local clock time ought to have been achieved by following the above operational steps:

a) for the equation of time—during approximately mid-April through mid-June and during approximately the $1^{st}$ of September through the $1^{st}$ of January, the apparent solar time as indicated by the solar dial is fast with respect to mean solar time. At October $1^{st}$ the apparent solar time shown by the solar dial is approximately 15 minutes fast with respect to mean solar time;

b) for longitude—Midland is seen to be three longitude lines displaced west of the Central time zone meridian. As each longitude line indicia represents 15 minutes of time, this displacement is equal to 45 minutes. The apparent solar time as shown by the solar dial is therefore approximately 45 minutes slow with respect to the mean solar time; and c) for standard time versus daylight saving time—daylight saving time is in effect in October, therefore the apparent solar time as shown by the solar dial is 60 minutes slow with respect to mean solar time.

The correction required then is as follows:

clock time=apparent solar time+equation of time correction+longitude correction+daylight saving time correction; EQ. 3 an example being:

clock time=3:30 p.m.−15 minutes+45 minutes+60 minutes=5 p.m.

The clock time 80314 is shown as 5 p.m., agreeing with the above analysis, demonstrating that each of the three correction factors has been properly accounted for.

While an exemplary embodiment of the present invention has been described above, it should be understood that it has been presented by way of example only, and not limitation. Thus, the breadth and scope of the present invention should not be limited by the above-described exemplary embodiment, but should be defined only in accordance with the following claims and their reasonable equivalents.

What is claimed:

1. A sundial for providing apparent solar time, the sundial comprising:

a. a substantially planar solar dial having:

i. an index point and a noon hour point, a longitudinal axis being defined by a line between said index point and said noon hour point;

ii. a plurality of concentric latitude indicia centered at said index point;

iii. at least one latitude map indicium overlaid by said concentric latitude indicia, said latitude map indicium having geographic latitudes corresponding with said concentric latitude indicia on said solar dial; and iv. a plurality of solar time indicia overlaid on said plurality of concentric latitude indicia and said latitude map indicium and radiating generally outward from said index point so as to intercept said concentric latitude indicia;

b. an elongated gnomon having a first end and a second end and when operatively positioned with respect to said solar dial, said first end being located at said index point; and c. a gnomon support element providing support for said second end of said gnomon at a variable angular offset above said solar dial, thereby defining a selective angle of said gnomon with respect to said solar dial;

whereby the sun's shadow cast by said gnomon intersects said solar time indicia in relation to said concentric latitude indicia corresponding to the user's geographic location as found on said latitude map indicium to provide a reading of apparent solar time at the user's latitude.

2. The sundial according to claim 1, wherein said gnomon support element has at least one gnomon support map indicium thereon configured with geographic latitude lines and has a gnomon rest element adjustably securable thereto for supporting said second end of said gnomon.

3. The sundial according to claim 1, and further comprising:

d. a substantially planar clock dial generally concentric with said solar dial and having on its face a 12 o'clock point and a plurality of clock time indicia located at predetermined angles; and e. retention means for retaining said clock dial in proximity to said solar dial while allowing said 12 o'clock point to be adjusted with respect to said noon hour point thereby enabling said solar time indicia to be offset from said clock time indicia;

whereby the sun's shadow cast by said gnomon intersects said solar time indicia in relation to said concentric latitude indicia corresponding to the user's geographic location as found on said latitude map indicium shows the apparent solar time and by extension clock time at the user's latitude.

4. The sundial according to claim 3, and further comprising:

f. a time zone map indicium having a plurality of longitude indicia; and g. a plurality of time zone meridian indicia;

said retention means retaining said time zone map indicium in proximity to said plurality of time zone meridian indicia while allowing said time zone map indicium to be offset with respect to said plurality of time zone meridian indicia wherein offsetting any of said longitude indicia on said time zone map indicium relative to said plurality of time zone meridian indicia by an angle of geographic longitude as represented by said longitude indicia on said time zone map indicium results in an equivalent time offset between said noon hour point and said 12 o'clock point;

whereby the sun's shadow cast by said gnomon intersects said solar time indicia in relation to said concentric latitude indicia corresponding to the user's geographic location as found on said latitude map indicium to provide a reading of the apparent solar time and by extension clock time at the user's latitude and longitude.

5. The sundial according to claim 4, and further comprising:

h. means for correction of the equation of time comprising:

i. an equation of time indicium comprising a time error graph representation and a calendar representation; and ii. equation of time adjustment means configured to retain said time zone map indicium in proximity to said plurality of time zone meridian indicia while allowing said time zone map indicium to be offset with respect to said plurality of time zone meridian indicia wherein offsetting any of said longitude indicia on said time zone map indicium relative to said plurality of time zone meridian indicia by an angle of geographic longitude as represented by said longitude indicia on said time zone map indicium results in an equivalent time offset between said noon hour point and said 12 o'clock point, while further allowing both said time zone map indicium and said plurality of time zone meridian indicia to be jointly adjusted relative to said equation of time indicium producing a further time offset between said noon hour point and said 12 o'clock point;

whereby the sun's shadow cast by said gnomon intersects said solar time indicia in relation to said concentric latitude indicia corresponding to the user's geographic location as found on said latitude map indicium to provide a reading of the apparent solar time and by extension clock time at the user's latitude and longitude corrected for the equation of time.

6. The sundial according to claim 2 whereby adjustment of the angle of said gnomon with respect to said longitudinal axis to intercept the latitude where said sundial is located as found by reference to said gnomon support map indicia sets the angle of said gnomon substantially equal to the latitude of said location.

7. The sundial according to claim 1, and further comprising:

i. a magnetic compass with means to align said longitudinal axis to magnetic north as indicated by said magnetic compass;

whereby said sundial can be oriented to magnetic north by aligning said longitudinal axis to magnetic north as indicated on said magnetic compass.

8. The sundial according to claim 1, and further comprising:

j. a magnetic compass;

k. a magnetic compass declination map indicium;

l. means to retain said magnetic compass in proximity to said magnetic compass declination map indicium; and m. means to align said longitudinal axis to true north as indicated by said magnetic compass in combination with said magnetic compass declination map indicium;

whereby said sundial can be oriented to true north by aligning said longitudinal axis to magnetic north as indicated on said magnetic compass, and correcting the alignment to true north by reference to said magnetic compass declination map indicium.

9. The sundial according to claim 1, and further comprising:

n. at least one spirit level; and o. leveling means;

whereby said sundial is configured to be oriented to the earth's horizon by operating said leveling means with reference to said spirit level.

10. The sundial according to claim 1, and further comprising:

p. means for detachably mounting said gnomon to said sundial and said gnomon support; and q. means for detachably mounting said gnomon support to said sundial;

whereby said sundial is collapsible into a compact essentially planar form-factor.

11. The sundial according to claim 1, and further comprising:

r. a token;

whereby said token is placeable at the intersection of the sun's shadow cast by said gnomon on said solar time indicia in the proximity of the user's geographic location as found on said latitude map indicium to assist in reading said sundial.

12. A sundial for providing apparent solar time, the sundial comprising:

a. a substantially planar solar dial having:

i. an index point and a noon hour point, a longitudinal axis being defined by a line between said index point and said noon hour point;

ii. a plurality of concentric latitude indicia centered at said index point, said plurality of concentric latitude indicia each being identified by latitude numeric indicia; and iii. a plurality of solar time indicia overlaid on said plurality of concentric latitude indicia and radiating generally outward from said index point so as to intercept said concentric latitude indicia;

b. an elongated gnomon having a first end and a second end and when operatively positioned with respect to said solar dial, said first end being located at said index point; and c. a gnomon support element providing support for said second end of said gnomon at a variable angular offset above said solar dial, said gnomon support element being provided with a plurality of angular offset indicia substantially corresponding to said latitude numeric indicia, said gnomon support element being further provided with at least one gnomon support map indicium wherein the latitudes of geographic locations on said gnomon support map indicium are substantially the same as said angular offset indicia crossing said geographic locations;

whereby the sun's shadow cast by said gnomon intersects said solar time indicia in relation to said concentric latitude indicia corresponding to the user's geographic location as found on said gnomon support map indicium to provide a reading of apparent solar time at the user's latitude.

13. The sundial according to claim 12, and further comprising:

d. a substantially planar clock dial generally concentric with said solar dial and having on its face a 12 o'clock point and a plurality of clock time indicia located at predetermined angles; and e. retention means for retaining said clock dial in proximity to said solar dial while allowing said 12 o'clock point to be adjusted with respect to said noon hour point thereby enabling said solar time indicia to be offset from said clock time indicia;

whereby the sun's shadow cast by said gnomon intersects said solar time indicia in relation to said concentric latitude indicia corresponding to the user's geographic location as found on said gnomon support map indicium to provide a reading of apparent solar time and by extension clock time at the user's latitude.

14. The sundial according to claim 13, and further comprising:

f. a time zone map indicium having a plurality of longitude indicia; and g. a plurality of time zone meridian indicia;

said retention means retaining said time zone map indicium in proximity to said plurality of time zone meridian indicia while allowing said time zone map indicium to be offset with respect to said plurality of time zone meridian indicia wherein offsetting any of said longitude indicia on said time zone map indicium relative to said plurality of time zone meridian indicia by an angle of geographic longitude as represented by said longitude indicia on said time zone map indicium results in an equivalent time offset between said noon hour point and said 12 o'clock point;

whereby the sun's shadow cast by said gnomon intersects said solar time indicia in relation to said concentric latitude indicia corresponding to the user's geographic location as found on said gnomon support map indicium to provide a reading of the apparent solar time and by extension clock time at the user's latitude and longitude.

15. The sundial according to claim 14, and further comprising:

h. means for correction of the equation of time comprising;

i. an equation of time indicium comprising a time error graph representation and a calendar representation; and ii. equation of time adjustment means configured to retain said time zone map indicium in proximity to said plurality of time zone meridian indicia while allowing said time zone map indicium to be offset with respect to said time zone meridian indicia wherein offsetting any of said longitude indicia on said time zone map indicium relative to said plurality of time zone meridian indicia by an angle of geographic longitude as represented by said longitude indicia on said time zone map indicium results in an equivalent time offset between said noon hour point and said 12 o'clock point, while further allowing both said time zone map indicium and said plurality of time zone meridian indicia to be jointly adjusted relative to said equation of time indicium producing a further time offset between said noon hour point and said 12 o'clock point;

whereby the sun's shadow cast by said gnomon intersects said solar time indicia in relation to said concentric latitude indicia corresponding to the user's geographic location as found on said gnomon support map indicium to provide a reading of the apparent solar time and by extension clock time at the user's latitude and longitude corrected for the equation of time.

16. The sundial according to claim 12, and further comprising:

i. at least one latitude map indicium on said solar dial overlaid by said plurality of concentric latitude indicia wherein the latitudes of geographic locations on said latitude map indicium are substantially the same as those represented by said concentric latitude indicia crossing said geographic locations;

whereby the sun's shadow cast by said gnomon intersects said solar time indicia in relation to said concentric latitude indicia corresponding to the user's geographic location as found on said latitude map indicium to provide a reading of apparent solar time at the user's latitude.

17. The sundial according to claim 12, and further comprising:

j a magnetic compass with means to align said longitudinal axis to magnetic north as indicated by said magnetic compass;

whereby said sundial can be oriented to magnetic north by aligning said longitudinal axis to magnetic north as indicated on said magnetic compass.

18. The sundial according to claim 12, and further comprising:

k. a magnetic compass;

l. a magnetic compass declination map indicium;

m. means to retain said magnetic compass in proximity to said magnetic compass declination map indicium; and n. means to align said longitudinal axis to true north as indicated by said magnetic compass in combination with said magnetic compass declination map indicium;

whereby said sundial can be oriented to true north by aligning said longitudinal axis to magnetic north as indicated on said magnetic compass and correcting the alignment to true north by reference to said magnetic compass declination map indicium.

19. The sundial according to claim 12, and further comprising:

o. at least one spirit level; and p. leveling means;

whereby said sundial is configured to be oriented to the earth's horizon by operating said leveling means with reference to said spirit level.

20. The sundial according to claim 12, and further comprising:

q. means for detachably mounting said gnomon to said sundial and said gnomon support; and r. means for detachably mounting said gnomon support to said sundial;

whereby said sundial is collapsible into a compact essentially planar form-factor.

21. The sundial according to claim 12, and further comprising:

s. a token;

whereby said token is placeable at the intersection of the sun's shadow cast by said gnomon on said solar time indicia in relation to said plurality of concentric latitude indicia in the proximity of the user's geographic location as found on said gnomon support map indicium to assist in reading the sundial.

22. A method for providing apparent solar time over a range of latitudes employing a sundial comprising a substantially planar solar dial having an index point and a noon hour point, a longitudinal axis being defined by a line between said index point and said noon hour point, a plurality of concentric latitude indicia centered at said index point, said plurality of concentric latitude indicia each being identified by latitude numeric indicia, at least one latitude map indicium overlaid by said concentric latitude indicium, said latitude map indicium having geographic latitudes corresponding with said concentric latitude indicia, and a plurality of solar time indicia overlaid on said concentric latitude indicia and said latitude map indicium and radiating generally outward from said index point so as to intercept said concentric latitude indicia; an elongated gnomon having a first end and a second end and when operatively positioned with respect to said solar dial, said first end being located at said index point; and a gnomon support element providing support for said second end of said gnomon at a selective location above said solar dial, said gnomon support having a plurality of angular offset indicia, said plurality of angular offset indicia being identified by angular offset indicia substantially corresponding to said latitude numeric indicia thereby defining a selective angle of said gnomon with respect to said solar dial, the method comprising:

orienting said solar dial with respect to the earth's horizon and true north;

angularly adjusting, with reference to the plurality of angular offset indicia as corresponding to said latitude map indicium and said latitude numeric indicia, said gnomon with respect to said longitudinal axis to the angle of the latitude where said sundial is located;

observing the intersection of the sun's shadow cast by said gnomon on said solar time indicia in relation to said concentric latitude indicia at the proximity of the user's geographic location as found on said latitude map indicium; and reading the apparent solar time at the user's latitude.

23. A method for providing apparent solar time over a range of latitudes employing a sundial comprising a substantially planar solar dial having an index point, a noon hour point, a longitudinal axis defined by a line between said index point and said noon hour point, a plurality of concentric latitude indicia centered at said index point, said plurality of concentric latitude indicia each being identified by latitude numeric indicia, and a plurality of solar time indicia overlaid on said plurality of concentric latitude indicia and radiating generally outward from said index point so as to intercept said concentric latitude indicia; an elongated gnomon having a first end and a second end and when operatively positioned with respect to said solar dial, said first end being located at said index point; and a gnomon support element providing support for said second end of said gnomon at a selective location above said solar dial, said gnomon support element being provided with a plurality of angular offset indicia substantially corresponding to said latitude numeric indicia, said gnomon support element being further provided with at least one gnomon support map indicium wherein the latitudes of geographic locations on said gnomon support map indicium are substantially the same as said angular offset indicia crossing said geographic locations, the method comprising:

orienting said solar dial with respect to the earth's horizon and true north;

angularly adjusting, with reference to said gnomon support map indicium, said gnomon with respect to said longitudinal axis to the angle of the latitude where said sundial is located;

observing the intersection of the sun's shadow cast by said gnomon on said solar time indicia in relation to said concentric latitude indicia at the proximity of the user's geographic location as found on said gnomon support map indicium; and reading the apparent solar time at the user's latitude.

* * * * *